(12) United States Patent
Ootsuki

(10) Patent No.: US 9,388,259 B2
(45) Date of Patent: Jul. 12, 2016

(54) PHOTOSENSITIVE POLYMER AND PHOTOALIGNABLE PHASE DIFFERENCE FILM

(71) Applicants: JNC CORPORATION, Tokyo (JP); JNC PETROCHEMICAL CORPORATION, Tokyo (JP)

(72) Inventor: Daisuke Ootsuki, Ichihara (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 0 days.

(21) Appl. No.: 14/166,092

(22) Filed: Jan. 28, 2014

(65) Prior Publication Data

US 2014/0225047 A1 Aug. 14, 2014

(30) Foreign Application Priority Data

Feb. 8, 2013 (JP) ................................ 2013-023588

(51) Int. Cl.
| | |
|---|---|
| *F21V 9/00* | (2015.01) |
| *G02B 5/02* | (2006.01) |
| *G02C 7/10* | (2006.01) |
| *G02F 1/361* | (2006.01) |
| *G03B 11/00* | (2006.01) |
| *C08F 20/68* | (2006.01) |
| *C08F 220/30* | (2006.01) |
| *G02F 1/13* | (2006.01) |
| *G02B 1/10* | (2015.01) |
| *G02B 5/30* | (2006.01) |

(52) U.S. Cl.
CPC ............... *C08F 20/68* (2013.01); *C08F 220/30* (2013.01); *G02B 5/3083* (2013.01)

(58) Field of Classification Search
USPC ........... 252/582; 349/193; 359/580; 524/377, 524/388; 525/100, 200; 526/313
See application file for complete search history.

(56) References Cited

U.S. PATENT DOCUMENTS

| 2002/0063822 A1 | 5/2002 | Kondo et al. ............. 349/106 |
| 2002/0128341 A1 | 9/2002 | Sakai et al. ............. 522/1 |
| 2004/0119924 A1 | 6/2004 | Takeda et al. ............. 349/129 |
| 2008/0049319 A1 | 2/2008 | Kato et al. ............. 359/485 |
| 2009/0087590 A1 * | 4/2009 | Aiki et al. ............. 428/1.1 |

FOREIGN PATENT DOCUMENTS

| DE | WO 2012/085048 A1 * | 6/2012 | ............. C08G 73/00 |
| EP | 0 118 238 A2 | 9/1984 | |
| JP | 61-66419 A | 4/1986 | |
| JP | 8-29392 A | 2/1996 | |
| JP | 2001-68384 A | 3/2001 | |
| JP | 2002-202409 A | 7/2002 | |
| JP | 2003-307619 A | 10/2003 | |
| JP | 2008-276149 A | 11/2008 | |
| JP | 2009-209953 A | 9/2009 | |
| JP | 04788123 B2 | 10/2011 | |
| WO | WO 2012-115017 A1 | 8/2012 | |

\* cited by examiner

*Primary Examiner* — Bijan Ahvazi
(74) *Attorney, Agent, or Firm* — Stein IP, LLC

(57) ABSTRACT

To provide a photosensitive polymer, a phase difference film using the photosensitive polymer, and an optical film using the phase difference film. A solution is a photosensitive polymer having a constitutional unit represented by formula (1):

(1)

$$R^1-\underset{CH_2}{\overset{O}{\underset{\|}{C}}}-O-(CH_2)_p-X^1\underset{a}{\Big]}-A^1-Z^1\underset{b}{\Big]}-\underset{W^1\ W^2}{\bigcirc}-CH=CH-\underset{\|}{\overset{O}{C}}-Y^1-R^2$$

wherein, in formula (1), for example, $R^1$ is hydrogen or methyl; a is 2 or 3; p is an integer from 1 to 12; $X^1$ is —O—, —COO— or —OCO—; b is an integer from 0 to 3; $A^1$ is a divalent group selected from 1,4-phenylene or naphthalene-2,6-diyl, and in the divalent group, at least one of hydrogen may be replaced by fluorine or chlorine; $Z^1$ is a single bond, —COO—, —CH=CH—COO—, —$CH_2CH_2$—COO—, —$CH_2$O— or —CONH—; $W^1$ and $W^2$ are hydrogen, fluorine or 1-5C alkyl or alkoxy; $Y^1$ is —O—; and $R^2$ is 1-20C alkyl, and at least one of —$CH_2$— in the alkyl may be replaced by —O—.

10 Claims, No Drawings

PHOTOSENSITIVE POLYMER AND PHOTOALIGNABLE PHASE DIFFERENCE FILM

CROSS-REFERENCE TO RELATED APPLICATIONS

This application claims the benefit of Japanese Application No. 2013-023588, filed Feb. 8, 2013, in the Japanese Patent Office. All disclosures of the document(s) named above are incorporated herein by reference.

BACKGROUND OF THE INVENTION

1. Field of the Invention

The present invention relates to a polymer having a cinnamic acid moiety as a photosensitive group, a phase difference film using the polymer, and an optical film using the phase difference film, and also an alignment film using the polymer. More specifically, the invention relates to a photosensitive polymer having satisfactory solubility to an organic solvent and having liquid crystallinity, and use of the polymer allows preparation of a phase difference film having desired optical characteristics without needing a liquid crystal alignment film. The phase difference film is suitable for use in an optical application, particularly, an optical compensation film or a phase difference film in a liquid crystal display, a patterned phase difference film used for a passive glasses type 3D display, or the like. Furthermore, the photosensitive polymer can also align a liquid crystal material, and therefore is suitable for lamination of optical anisotropic materials such as a polymerizable liquid crystal and a liquid crystalline polymer.

2. Description of the Related Art

A liquid crystal display device is used in various kinds of liquid crystal display apparatuses, including a monitor of a notebook-sized personal computer or a desktop personal computer, a viewfinder of a video camera, a projection display and a television. The liquid crystal display device is further utilized as an optoelectronics-related device such as an optical printer head, an optical Fourier transformation device and a light valve. As a liquid crystal display device that has been applied so far, a display device using a nematic liquid crystal is predominantly applied, and a practical application has been made for a liquid crystal display device having a twisted nematic (TN) mode in which a direction of alignment of liquid crystals in the vicinity of one substrate, and a direction of alignment of liquid crystals in the vicinity of the other substrate are twisted at an angle of 90 degrees, a super twisted nematic (STN) mode in which the directions of alignment are ordinarily twisted at an angle of 180 degrees or more, and a so-called thin-film-transistor (TFT) mode in which a thin-film transistor is used.

However, a viewing angle at which an image can be properly visually recognized is narrow in the liquid crystal display devices, and when the image is viewed from an oblique direction, luminance or contrast may be occasionally decreased, and luminance inversion may be occasionally caused in a halftone. The issue of the viewing angle has been recently improved by a liquid crystal display device having a TN mode in which an optical compensation film is used, a multi-domain vertical alignment (MVA) mode in which a technology of homeotropic alignment and a technology of protrusion structure are simultaneously applied (see Patent literature No. 1), an in-plane switching (IPS) mode according to a transverse electric field mode (see Patent literature No. 2), or the like.

Development of technology on the liquid crystal display device has been achieved not only by an improvement of a driving mode and device structure as described above but also by an improvement of a member used for the display device. Among the members used for the display device, the optical compensation film or the phase difference film is one of important elements related to an image display quality for achieving an improvement in contrast or extension of a viewing angle range in the liquid crystal display device, and plays an increasingly important role with achieving a high quality of the display device year by year. As such an optical compensation film or a phase difference film, a stretched film having refractive index anisotropy or a film prepared by aligning and polymerizing a polymerizable liquid crystal compound is used.

With regard to the optical compensation film or the phase difference film, further precise control of refractive index anisotropy has been recently required for further enhancing an improvement in contrast or extension of the viewing angle range in the image display device. In such a present circumstance, the stretched film has a problem of a limited stretching direction and difficulty in precise control of the refractive index anisotropy during manufacture.

In the film prepared by aligning and polymerizing the polymerizable liquid crystal compound, the polymerizable liquid crystal compound shows optical anisotropy in a liquid crystal state, and polymerizes, thereby the alignment thereof being immobilized. Specific examples of alignment states in which the polymer is immobilized include "homogeneous" (homogeneous alignment), "tilt" (tilted alignment), "homeotropic" (homeotropic alignment) and "twist" (twisted alignment). Control of alignment of the polymerizable liquid crystal compounds allows precise control of refractive index anisotropy (see Patent literature Nos. 3 to 4).

Furthermore, a passive glasses type 3D display is put in practical use as one of 3D display types, and in the 3D display, a phase difference plate is mounted on a liquid crystal display panel. As the phase difference plate, study has been conducted for a patterned phase difference plate prepared by aligning a polymerizable liquid crystal compound to a liquid crystal alignment film subjected to alignment treatment by a photoalignment method.

However, the optical compensation film or the phase difference film formed of the polymerizable liquid crystal compound requires alignment of the polymerizable liquid crystal compound in order to develop desired optical characteristics. In general, the polymerizable liquid crystal compound is applied onto the liquid crystal alignment film subjected to alignment treatment to control alignment, and therefore the optical compensation film or the phase difference film has a problem that requires the liquid crystal alignment film.

A proposal has been recently made for a phase difference film in which a liquid crystalline polymer is irradiated with light to control molecular alignment (see Patent literature Nos. 5 to 9). The liquid crystalline polymer has a photosensitive group that reacts by irradiation with light, thereby allowing control of an alignment axis. Therefore, the phase difference film can be prepared without using an alignment film. Moreover, the phase difference film allows three-dimensional alignment achievement of which has been difficult by a conventional stretched film or polymerizable liquid crystal material (see Patent literature No. 7 or 8). In order to manufacture the phase difference film using such a polymer, the polymer is first dissolved into a solvent to apply the resulting solution onto a substrate, dry the resulting material, and irradiate the resulting film with linearly polarized light or the like, and heat the film, and thus the phase difference film is prepared. As the solvent for dissolving the polymer in such a process, a solvent having toxicity and environmental load as low as possible is desired. However, the arts have a problem of poor solubility of the polymer described in Patent literatures Nos. 5 to 8 and use of a solvent having comparatively high toxicity or environmental load. Furthermore, for a substrate of the optical compensation film or the phase difference film, a plastic such as polyethylene terephthalate (PET), triacetyl cellulose (TAC) and a cyclic olefinic polymer may be occasionally used. Such a plastic substrate has lower solvent resistance in comparison with glass, and therefore use of a solvent that is hard to allow erosion (dissolution, swelling) of the substrate is required.

The polymer described in Patent literature No. 9 has relatively good solubility, and has a possibility of solving the problem described above. However, when a phase difference film is prepared from the polymer, characteristics of the phase difference film, such as optical anisotropy may be occasionally insufficient without passing through a complicated manufacturing step, and desire is expressed for a material that can further simply and positively prepare a high-quality phase difference film.

CITATION LIST

Patent Literature

Patent literature No. 1: JP 1999-242225 A.
Patent literature No. 2: JP 1994-160878 A.
Patent literature No. 3: JP 1984-188483 A.
Patent literature No. 4: JP 2005-113131 A.
Patent literature No. 5: JP 2008-276149 A.
Patent literature No. 6: JP 2002-202409 A.
Patent literature No. 7: JP 2003-307619 A.
Patent literature No. 8: JP 2008-50440 A.
Patent literature No. 9: WO 2012/115017 A1.

SUMMARY OF THE INVENTION

Technical Problem

An object of the invention is to provide a photosensitive polymer that allows preparation of a phase difference film having desired optical characteristics and without passing through a complicated manufacturing step, shows high optical anisotropy even when thickness of the phase difference film is large, and is excellent in solubility to a solvent having low toxicity or environmental load, and to provide a high-quality phase difference film using the polymer. A further object is to provide a laminate formed by applying a liquid crystal material onto the phase difference film.

Solution to Problem

The present inventors have diligently continued to conduct research and development, and as a result, have found that the problem described above can be solved by using a photosensitive polymer including a constitutional unit having specific spacer structure and having a photosensitive group showing photoalignment properties. Moreover, the present inventors have achieved provision of a high-quality phase difference film that allows use of a solvent having low toxicity or environmental load and without using a liquid crystal alignment film by using the polymer. Furthermore, the present inventors also have found that the phase difference film allows alignment of a liquid crystal material to easily allow formation of a laminate of optical anisotropic materials such as a polymerizable liquid crystal and a liquid crystalline polymer. More specifically, the invention is as described below.

Item 1. A photosensitive polymer having a constitutional unit represented by formula (1):

Formula 1

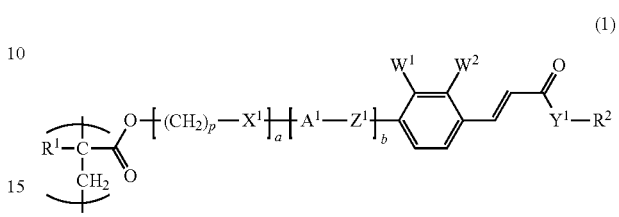

wherein, in formula (1), $R^1$ is independently hydrogen or methyl; a is 2 or 3; p is independently an integer from 1 to 12; $X^1$ is independently —O—, —COO—, —OCO—, —OCOO—, —CH=CH— or —C≡C—; b is an integer from 0 to 3; $A^1$ is independently any one of divalent group selected from 1,4-phenylene, 1,4-cyclohexylene, pyridine-2,5-diyl or naphthalene-2,6-diyl, and in the divalent group, at least one of hydrogen may be replaced by fluorine, chlorine, cyano, hydroxy, formyl, acetoxy, acetyl, trifluoroacetyl, difluoromethyl, trifluoromethyl, alkyl having 1 to 5 carbons or alkoxy having 1 to 5 carbons; $Z^1$ is independently a single bond, —O—, —COO—, —OCO—, —CH=CH—COO—, —CH$_2$CH$_2$—COO—, —CH$_2$O—, —OCH$_2$—, —CF$_2$O—, —OCF$_2$—, —CONH—, —NHCO—, —(CH$_2$)$_4$—, —CH$_2$CH$_2$—, —CH=CH— or —C≡C—; $W^1$ and $W^2$ are independently hydrogen, fluorine, chlorine, trifluoromethyl, alkyl having 1 to 5 carbons or alkoxy having 1 to 5 carbons; $Y^1$ is a single bond, —O— or —NH—; and $R^2$ is alkyl having 1 to 20 carbons, and at least one of —CH$_2$— in the alkyl may be replaced by —O—, —COO—, —OCO—, —CH=CH— or —C≡C—.

Item 2. The photosensitive polymer according to item 1, wherein, in formula (1), p is independently an integer from 1 to 4; $X^1$ is independently —O—, —COO— or —OCO—; b is an integer from 1 to 3; $A^1$ is independently any one of divalent group selected from 1,4-phenylene or naphthalene-2,6-diyl, and in the divalent group, at least one of hydrogen may be replaced by fluorine, alkyl having 1 to 5 carbons or alkoxy having 1 to 5 carbons; $Z^1$ is independently a single bond, —COO—, —CH=CH—COO—, —CH$_2$CH$_2$—COO—, —CH$_2$O— or —CONH—; $W^1$ and $W^2$ are independently hydrogen, fluorine, alkyl having 1 to 5 carbons or alkoxy having 1 to 5 carbons; $Y^1$ is —O—; and $R^2$ is alkyl having 1 to 10 carbons, and at least one of —CH$_2$— in the alkyl may be replaced by —O—.

Item 3. The photosensitive polymer according to item 1 or 2, having a constitutional unit formed of a monomer having a hydrogen-bondable group.

Item 4. The photosensitive polymer according to item 3, wherein the hydrogen-bondable group includes a carboxyl group.

Item 5. The photosensitive polymer according to item 4, wherein a constitutional unit formed of a monomer having a hydrogen-bondable group at a terminal includes a constitutional unit represented by formula (2):

Formula 2

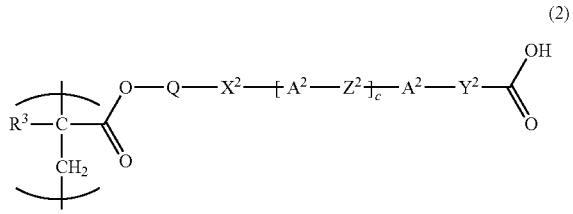

(2)

wherein, in formula (2), $R^3$ is hydrogen or methyl; Q is a single bond or alkylene having 1 to 20 carbons, and at least one of —$CH_2$— in the alkylene may be replaced by —O—, —COO—, —OCO—, —CH=CH— or —C≡C—; $X^2$ is a single bond, —O—, —COO—, —OCO—, —OCOO—, —CH=CH— or —C≡C—; $A^2$ is independently any one of divalent group selected from 1,4-phenylene, 1,4-cyclohexylene, pyridine-2,5-diyl or naphthalene-2,6-diyl, and in the divalent group, arbitrary hydrogen may be replaced by fluorine, chlorine, cyano, hydroxy, formyl, acetoxy, acetyl, trifluoroacetyl, difluoromethyl, trifluoromethyl, alkyl having 1 to 5 carbons or alkoxy having 1 to 5 carbons; $Z^2$ is independently a single bond, —O—, —COO—, —OCO—, —CH=CH—COO—, —$CH_2CH_2$—COO—, —$CH_2$O—, —O$CH_2$—, —$CF_2$O—, —O$CF_2$—, —CONH—, —NHCO—, —$(CH_2)_4$—, —$CH_2CH_2$—, —CH=CH— or —C≡C—; c is an integer from 0 to 2; and $Y^2$ is a single bond, —$CH_2CH_2$— or —CH=CH—.

Item 6. The photosensitive polymer according to item 5, wherein, in formula (2), Q is alkylene having 1 to 12 carbons, and at least one —$CH_2$— in the alkylene may be replaced by —O—, —COO— or —OCO—; $X^2$ is —O—, —COO— or —OCO—; $A^2$ is independently any one of divalent group selected from 1,4-phenylene or naphthalene-2,6-diyl, and in the divalent group, arbitrary hydrogen may be replaced by fluorine, alkyl having 1 to 5 carbons or alkoxy having 1 to 5 carbons; $Z^2$ is independently a single bond, —COO—, —CH=CH—COO—, —$CH_2CH_2$—COO—, —$CH_2$O—, —CONH— or —$CH_2CH_2$—; and $Y^2$ is a single bond.

Item 7. The photosensitive polymer according to any one of items 1 to 6, having liquid crystallinity.

Item 8. The photosensitive polymer according to any one of items 1 to 7, wherein weight average molecular weight is 1,000 to 500,000.

Item 9. A photoalignable phase difference agent, containing at least one photosensitive polymer according to any one of items 1 to 8.

Item 10. A phase difference film provided with optical anisotropy, by applying the photoalignable phase difference agent according to item 9 onto a substrate, irradiating the resulting material with linearly polarized light, and further heating the resulting irradiated material.

Item 11. An optical film manufactured using the phase difference film according to item 10.

Item 12. A display device manufactured using the optical film according to item 11.

Item 13. A laminate, formed by further applying an optical anisotropic material onto the phase difference film according to item 10.

Item 14. The laminate according to item 13, wherein the optical anisotropic material is an anisotropic polymer formed of a polymerizable liquid crystal composition.

Advantageous Effects of Invention

The invention concerns a photosensitive polymer having liquid crystallinity to form a phase difference film using the polymer. Therefore, use of a liquid crystal alignment film that has been so far used in a phase difference film using a polymerizable liquid crystal material is unnecessary. Therefore, a step for preparing a liquid crystal alignment film, and a liquid crystal aligning agent are unnecessary by use of a material according to the invention, thereby allowing simplification of a manufacturing process and reduction of manufacturing cost. Moreover, special alignment such as three-dimensional alignment is allowed to facilitate lamination of the phase difference films. Furthermore, the photosensitive polymer of the invention is excellent in solubility to an organic solvent to allow preparation of a phase difference film showing high anisotropy without passing through a complicated manufacturing step even when thickness of the phase difference film is large.

DESCRIPTION OF EMBODIMENTS

The invention will be explained in detail.

In order to prepare a phase difference film in the invention, at least one kind of polymer showing liquid crystallinity and having a photoreactive group (photosensitive group) is used. The polymer having the photoreactive group is referred to as the photosensitive polymer. The photosensitive polymer means a compound that causes at least one of a photoisomerization reaction, a photodimerization reaction, a phototransformation reaction and a photolytic reaction by irradiation with plane polarized light, for example. The photosensitive polymer is preferably a compound that causes a photoisomerization reaction or a photodimerization reaction by irradiation with light, and particularly preferably, a compound that causes a photodimerization reaction. The photosensitive polymer has preferably a weight average molecular weight of approximately 1,000 to approximately 500,000.

The compound that causes the photoisomerization reaction among the photosensitive polymers refers to a compound that causes steric isomerization or structural isomerization by action of light. Specific examples of the photoisomerization compound include a cinnamic acid compound (K. Ichimura et al., Macromolecules, 30, 903 (1997)), an azobenzene compound (K. Ichimura et al., Mol. Cryst. Liq. Cryst., 298, 221 (1997)), a hydrazono-β-ketoester compound (S. Yamamura et al., Liquid Crystals, Vol. 13, No. 2, page 189 (1993)), a stilbene compound (J. G. Victor and J. M. Torkelson, Macromolecules, 20, 2241 (1987)) and a spiropyran compound (K. Ichimura et al., Chemistry Letters, page 1063 (1992); K. Ichimura et al., Thin Solid Films, Vol. 235, page 101 (1993)). Moreover, a compound having the skeletons in a polymer main chain or a polymer side chain is also included. Among the compounds, a photoisomerization compound including double bond structure formed of —CH=CH— or —N=N— is preferred.

The compound that causes the photodimerization reaction among the photosensitive polymers refers to a compound that causes an addition reaction between two groups to be cyclized by irradiation with light. Specific examples of the photodimerization compound include a cinnamic acid derivative (M. Schadt et al., J. Appl. Phys., Vol. 31, No. 7, page 2155 (1992)), a coumarin derivative (M. Schadt et al., Nature., Vol. 381, page 212 (1996)), a chalcone derivative (Toshihiro Ogawa et al., Preprints of Symposium on Liquid Crystals, 2AB03, (1997)) and a benzophenone derivative (Y. K. Jang et al., SID Int. Symposium Digest, P-53 (1997)). Moreover, a compound having a derivative having the skeletons in a polymer main chain or a side chain is also included. Among the compounds, a polymer having a cinnamic acid derivative or a coumarin derivative skeleton in a side chain is preferred, and a polymer (side chain type polymer) having a cinnamic acid derivative skeleton in a side chain is further preferred.

A polymer showing liquid crystallinity but having no photoreactive group is referred to as a liquid crystalline polymer. A phase difference film using the liquid crystalline polymer is also proposed (JP 2004-123882 A). However, the phase difference film using the liquid crystalline polymer also needs to use a liquid crystal alignment film in a manner similar to the phase difference film using the polymerizable liquid crystal.

As the photosensitive polymer showing liquid crystallinity used for the phase difference film, a cinnamic acid derivative is preferred in view of height of photoreaction sensitivity, transparency, ease of manufacture, or the like.

In the description herein, a term "arbitrary" used upon explaining a symbol in a chemical formula means that "not only a position of an element (or functional group) but also the number thereof can be freely selected." Then, for example, an expression "arbitrary A may be replaced by B, C or D" includes a case where one of A may be replaced by any one of B, C and D, a case where two of arbitrary A may be replaced by two of B, C or D, and may replaced by B and C, B and D, or C and D. More specifically, in a case where an expression "arbitrary A may be replaced by B, C or D" is provided for the functional group when a certain functional group has one or more of A, the expression means that any one (a selected kind is taken as X herein) selected from B, C and D may be arranged in place of at least one of A present on the functional group. Here, when a plurality of A are replaced, a plurality of X arranged in place of A may be identical or different with each other. However, the number of X arranged in place of A is one to one of A. Accordingly, when arbitrary —CH$_2$— may be replaced by —O—, replacement resulting in a bonding group —O—O— is not included.

Moreover, a function having one polymerizable group may be occasionally referred to as a monofunction. Moreover, a function having two or more polymerizable groups may be occasionally referred to as a polyfunction or in terms of a designation according to the number of polymerizable groups (bifunction in a case of having two polymerizable groups, for example).

Moreover, a compound formed by introducing an arbitrary functional group into certain A compound may be occasionally referred to as a derivative or A derivative.

A photosensitive polymer may be occasionally abbreviated only as a polymer. Moreover, a liquid crystal display device may be occasionally abbreviated as a display device, and a liquid crystal alignment film may be occasionally abbreviated as an alignment film.

Hereinafter, the constitutional unit used as the photosensitive polymer of the invention is described.

Constitutional Unit (1)

The photosensitive polymer of the invention includes a polymer having a constitutional unit represented by formula (1):

Formula 3

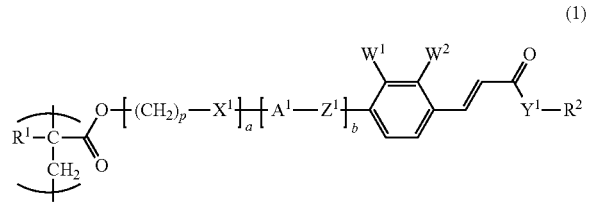

(1)

wherein, in formula (1), R$^1$ is independently hydrogen or methyl; a is 2 or 3; p is independently an integer from 1 to 12; X$^1$ is independently —O—, —COO—, —OCO—, —OCOO—, —CH═CH— or —C≡C—; b is an integer from 0 to 3; A$^1$ is independently any one of divalent group selected from 1,4-phenylene, 1,4-cyclohexylene, pyridine-2, 5-diyl or naphthalene-2,6-diyl, and in the divalent group, at least one of hydrogen may be replaced by fluorine, chlorine, cyano, hydroxy, formyl, acetoxy, acetyl, trifluoroacetyl, difluoromethyl, trifluoromethyl, alkyl having 1 to 5 carbons or alkoxy having 1 to 5 carbons; Z$^1$ is independently a single bond, —O—, —COO—, —OCO—, —CH═CH—COO—, —CH$_2$CH$_2$—COO—, —CH$_2$O—, —OCH$_2$—, —CF$_2$O—, —OCF$_2$—, —CONH—, —NHCO—, —(CH$_2$)$_4$—, —CH$_2$CH$_2$—, —CH═CH— or —C≡C—; W$^1$ and W$^2$ are independently hydrogen, fluorine, chlorine, trifluoromethyl, alkyl having 1 to 5 carbons or alkoxy having 1 to 5 carbons; Y$^1$ is a single bond, —O— or —NH—; and R$^2$ is alkyl having 1 to 20 carbons, and at least one of —CH$_2$— in the alkyl may be replaced by —O—, —COO—, —OCO—, —CH═CH— or —C≡C—.

Even a case where a conventional photosensitive polymer comprising structure similar to the structure described above (the polymer described in Patent literature No. 9, for example) is used has a problem of a significant decrease in optical anisotropy without applying complicated treatment such as drying under reduced pressure, or such as heating and drying after air drying for a long period of time, upon forming a phase difference film. In particular, when the thickness of the phase difference film is increased, the optical anisotropy has tended to be insufficient. On the other hand, as in the case of the invention, when the photosensitive polymer has the constitutional unit having the specific number of repeating units represented by —(CH$_2$)$_p$—X$^1$—, a phase difference film that is excellent in characteristics as the phase difference film, such as optical anisotropy, can be prepared from the polymer according to a simple manufacturing step with excellent work efficiency. In particular, even when a thick phase difference film is formed, a phase difference film that is excellent in characteristics, such as optical anisotropy can be prepared.

According to the invention, in view of ease of liquid crystallinity, ease of manufacture, height of alignment uniformity, or the like, in formula (1) described above, p is preferably an integer from 1 to 4, and X$^1$ is preferably —O—, —COO— or —OCO—.

Moreover, in view of ease of liquid crystallinity, ease of manufacture, or the like, b is preferably an integer from 1 to 3, and A$^1$ is preferably any one of divalent group selected from 1,4-phenylene and naphthalene-2,6-diyl. In the above case, specific examples of preferred substituent that the divalent group can have include fluorine, alkyl having 1 to 5 carbons and alkoxy having 1 to 5 carbons.

Furthermore, Z$^1$ is preferably a single bond, —COO—, —CH═CH—COO—, —CH$_2$CH$_2$—COO—, —CH$_2$O— or —CONH—, and W$^1$ and W$^2$ are preferably hydrogen, fluorine, alkyl having 1 to 5 carbons or alkoxy having 1 to 5 carbons, Y$^1$ is preferably —O—, R$^2$ is preferably alkyl having 1 to 10 carbons, and at least one of —CH$_2$— in the alkyl may be replaced by —O—.

The photosensitive polymer of the invention may include the constitutional unit represented by formula (1) in one kind only or in combination with two or more kinds.

Moreover, the photosensitive polymer of the invention may have only the constitutional unit represented by formula (1), but further includes preferably, in addition to the constitutional unit represented by formula (1), a constitutional unit formed of a monomer having a hydrogen-bondable group (polar group that may produce a hydrogen bond), desirably, a constitutional unit formed of a monomer having at a terminal a polar group that may produce a hydrogen bond. As the polar group, a hydroxyl group, an amino group, a carboxyl group or the like is further preferred, and a carboxyl group is still further preferred. The photosensitive polymer particularly preferably has a constitutional unit having at a terminal a carboxyl group as represented by formula (2):

Formula 4

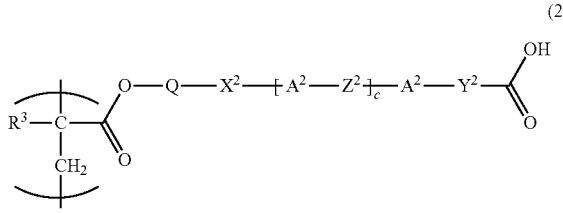

(2)

wherein, in formula (2), $R^3$ is hydrogen or methyl; Q is a single bond or alkylene having 1 to 20 carbons, and at least one of —$CH_2$— in the alkylene may be replaced by —O—, —COO—, —OCO—, —CH=CH— or —C≡C—; $X^2$ is a single bond, —O—, —COO—, —OCO—, —OCOO—, —CH=CH— or —C≡C—; $A^2$ is independently any one of divalent group selected from 1,4-phenylene, 1,4-cyclohexylene, pyridine-2,5-diyl or naphthalene-2,6-diyl, and in the divalent group, arbitrary hydrogen may be replaced by fluorine, chlorine, cyano, hydroxy, formyl, acetoxy, acetyl, trifluoroacetyl, difluoromethyl, trifluoromethyl, alkyl having 1 to 5 carbons or alkoxy having 1 to 5 carbons; $Z^2$ is independently a single bond, —O—, —COO—, —OCO—, —CH=CH—COO—, —$CH_2CH_2$—COO—, —$CH_2$O—, —O$CH_2$—, —$CF_2$O—, —O$CF_2$—, —CONH—, —NHCO—, —$(CH_2)_4$—, —$CH_2CH_2$—, —CH=CH— or —C≡C—; c is an integer from 0 to 2; and $Y^2$ is a single bond, —$CH_2CH_2$— or —CH=CH—.

Herein, in the invention, in view of ease of liquid crystallinity, ease of manufacture, or the like, in a manner similar to formula (1), Q is preferably alkylene having 1 to 12 carbons, and at least one of —$CH_2$— in the alkylene may be replaced by —O—, —COO— or —OCO—, $X^2$ is preferably —O—, —COO— or —OCO—, and $A^2$ is preferably any one of divalent group selected from 1,4-phenylene or naphthalene-2,6-diyl, and in the above case, specific examples of a preferred substituent that the divalent groups can have include fluorine, alkyl having 1 to 5 carbons or alkoxy having 1 to 5 carbons. Furthermore, $Z^2$ is preferably a single bond, —COO—, —CH=CH—COO—, —$CH_2CH_2$—COO—, —$CH_2$O—, —CONH— or —$CH_2CH_2$—, and $Y^2$ is preferably a single bond.

When the photosensitive polymer of the invention includes the constitutional unit represented by formula (2), the constitutional unit represented by formula (2) may be included in one kind only or in combination with two or more kinds.

In the invention, as described later, the phase difference film can be formed by irradiating a coating film formed from the photosensitive polymer with linearly polarized light, and then further heating the coating film. Here, when the photosensitive polymer of the invention also includes not only the constitutional unit represented by formula (1) but also the constitutional unit represented by formula (2), the irradiation with light can be made with lower irradiance, and alignment uniformity is improved during heat treatment, or the like, which tends to be further advantageous from an aspect of practical applicability.

Then, when a molar ratio of the constitutional unit represented by formula (1) and the constitutional unit represented by formula (2) that constitute the photosensitive polymer of the invention is expressed in terms of m:n under a condition: m+n=1, m and n are preferably in the range: 0.05≤m≤1, and in the range: 0≤n≤0.95 (wherein, m+n=1). Here, when m=1 and n=0, the photosensitive polymer includes the constitutional unit represented by formula (1), but does not include the constitutional unit represented by formula (2). On the other hand, when 0.05≤m≤1 and 0<n≤0.95, the photosensitive polymer includes both the constitutional unit represented by formula (1) and the constitutional unit represented by formula (2).

In the invention, m and n are further preferably in the range: 0.1≤m≤0.8, and in the range: 0.2≤n≤0.9, still further preferably, in the range: 0.1≤m≤0.5, and in the range: 0.5≤n≤0.9, and particularly preferably, in the range: 0.1≤m≤0.4 and in the range: 0.6≤n≤0.9 (wherein, m+n=1).

Hereinafter, specific examples of preferred constitutional units constituting the photosensitive polymer and represented by formula (1) and constitutional units represented by formula (2) are shown, but the invention is not limited by the specific examples. Moreover, the photosensitive polymer of the invention preferably has liquid crystallinity. Here, a word "liquid crystallinity" herein is not limited to a meaning of having a liquid crystal phase, but includes a meaning of having characteristics that can be used as a component of the liquid crystal composition upon mixing with any other liquid crystal compound even when the compound itself has no liquid crystallinity. Specific examples of the constitutional unit represented by formula (1) include compounds shown below.

Formula 5

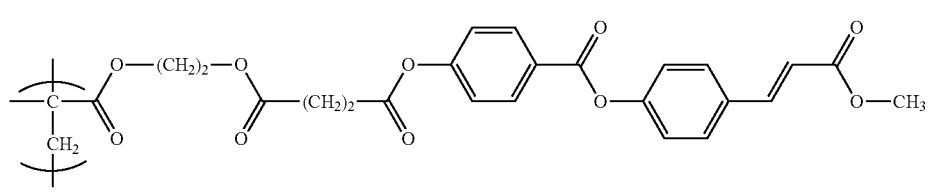

(1-1)

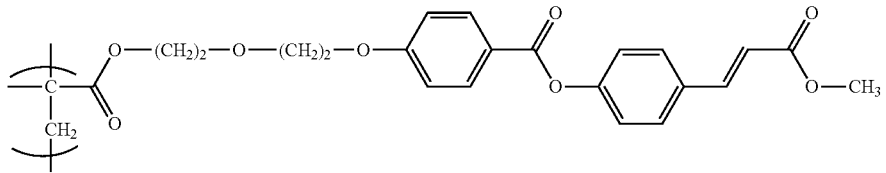
(1-2)
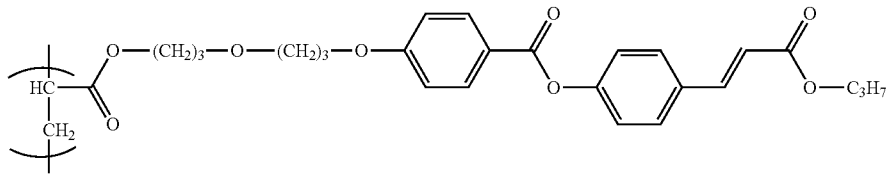
(1-3)
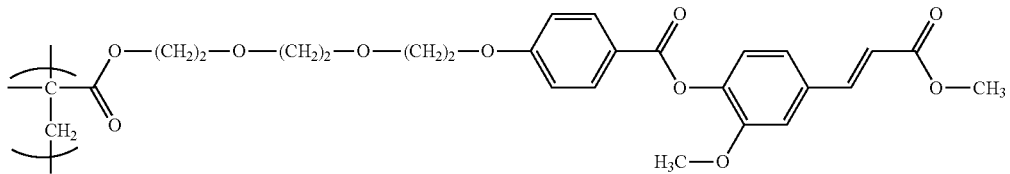
(1-4)
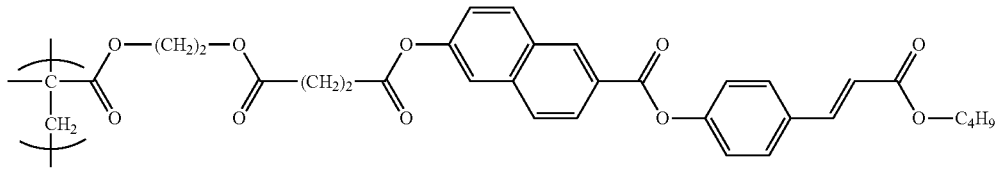
(1-5)
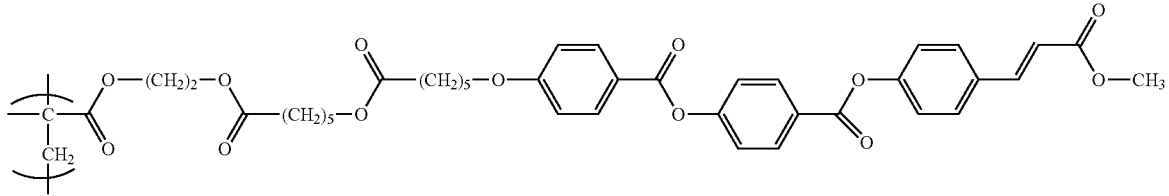
(1-6)
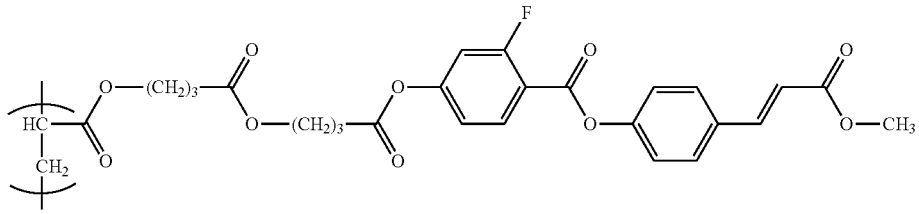
(1-7)
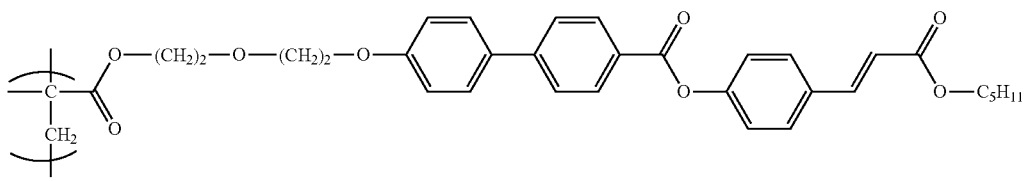
(1-8)
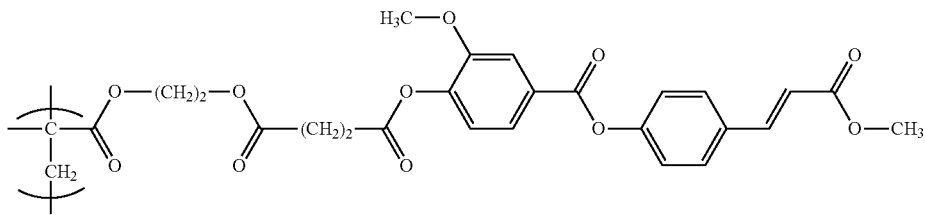
(1-9)

(1-10)
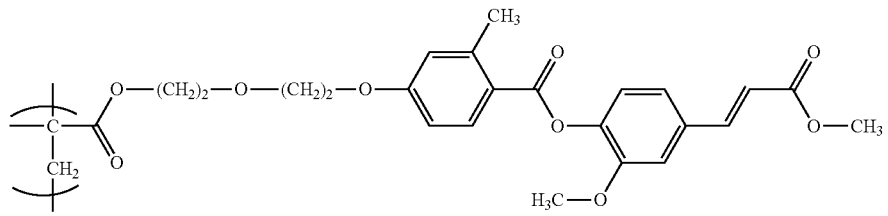
Formula 6
(1-11)
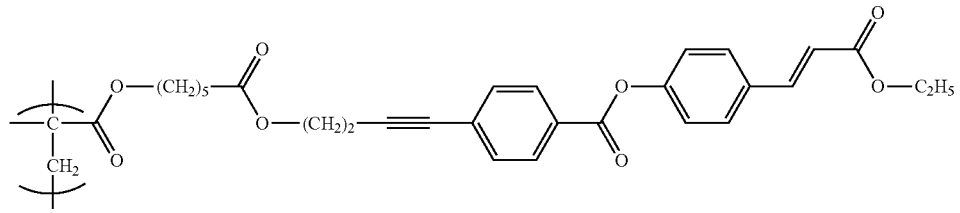
(1-12)
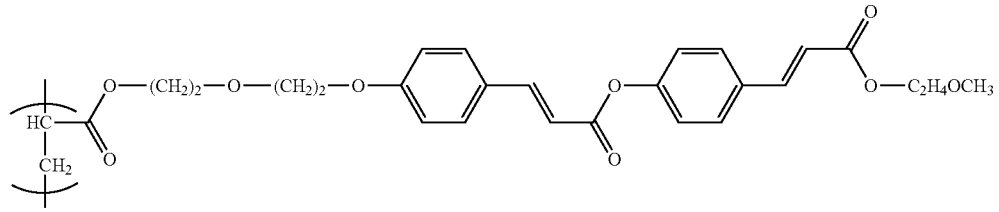
(1-13)
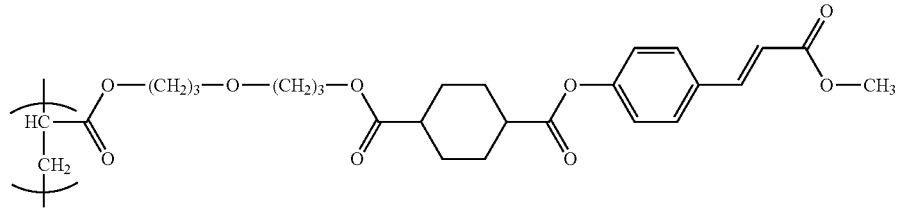
(1-14)
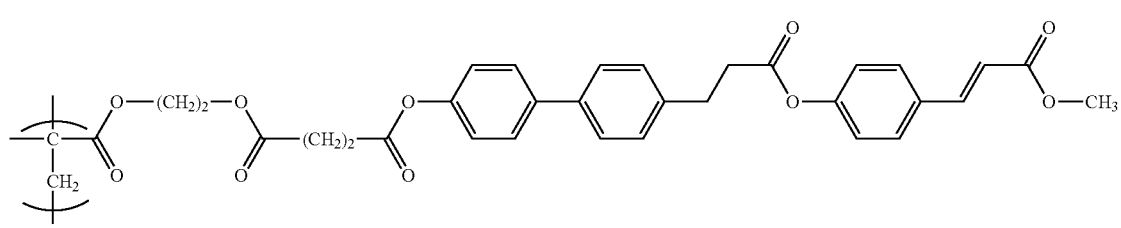
(1-15)
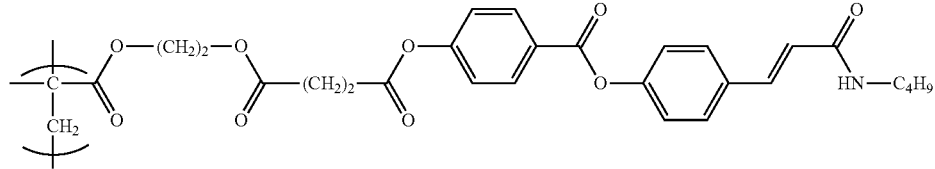
(1-16)
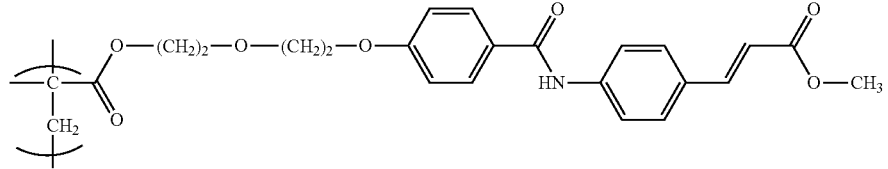

(1-17)
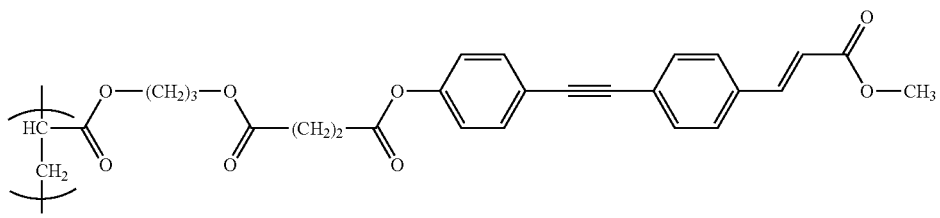
(1-18)
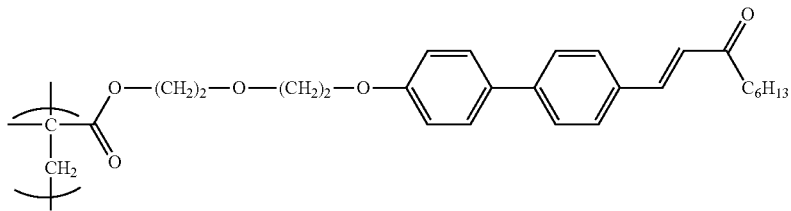
Moreover, specific examples of the constitutional units represented by formula (2) include compounds shown below.
Formula 7
(2-1) (2-2)
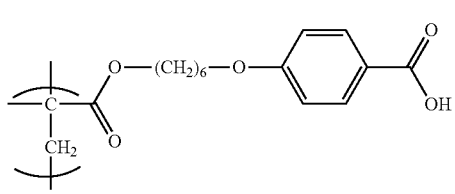
(2-3) (2-4)
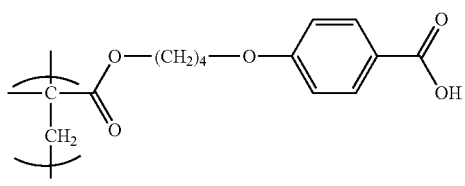
(2-5) (2-6)
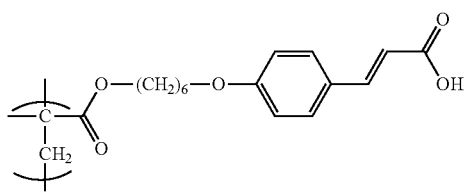
(2-7)
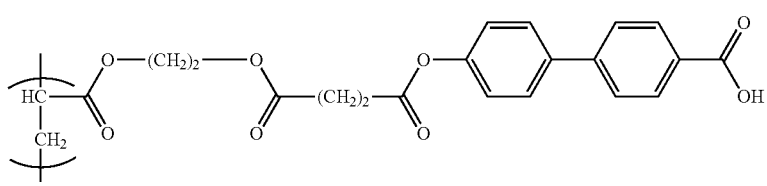
(2-8) (2-9)
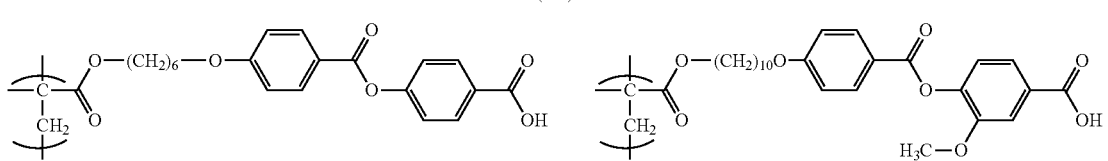

-continued

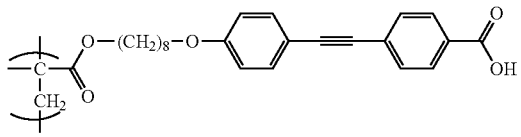
(2-10)
Formula 8

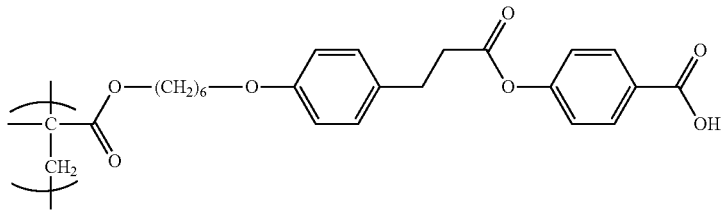
(2-11)

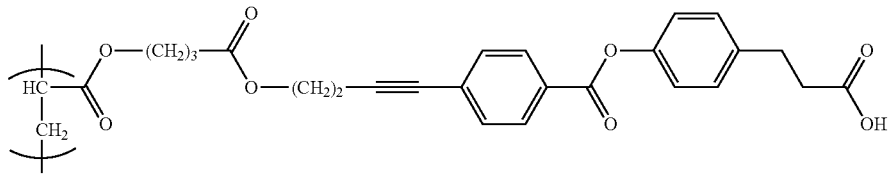
(2-12)

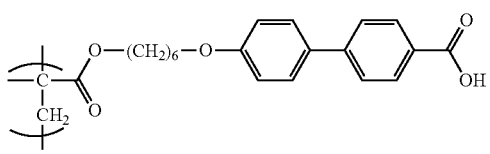
(2-13)

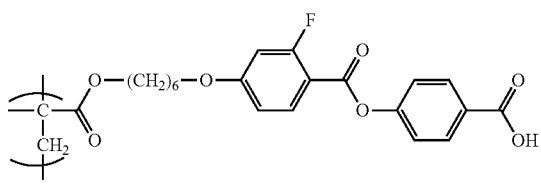
(2-14)

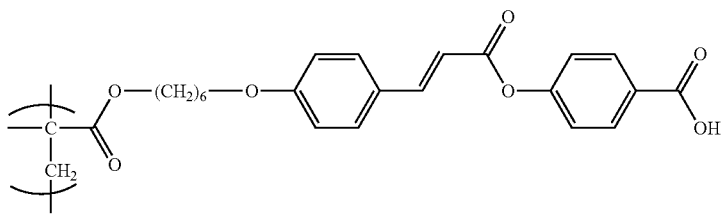
(2-15)

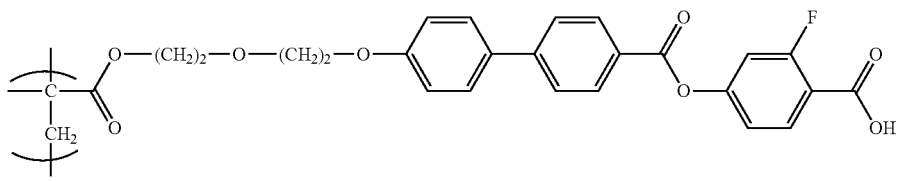
(2-16)

Then, Table 1 shows examples of preferred combinations of exemplified structure (1-1) to (1-18) of the constitutional units represented by formula (1) and exemplified structure (2-1) to (2-16) of the constitutional units represented by formula (2) in a photosensitive polymer. However, the combinations are not limited thereto.

TABLE 1

| Example of combinations | Constitutional unit represented by formula (1) | Constitutional unit represented by formula (2) |
|---|---|---|
| P-1 | 1-1 | 2-1 |
| P-2 | 1-2 | 2-1 |
| P-3 | 1-1 | 2-1, 2-8 |
| P-4 | 1-5 | 2-1 |
| P-5 | 1-2 | 2-14 |
| P-6 | 1-2 | 2-4 |
| P-7 | 1-9 | 2-13 |
| P-8 | 1-1, 1-2 | None |
| P-9 | 1-2, 1-5 | 2-1, 2-9, 2-14 |
| P-10 | 1-17 | 2-11 |

Then, the photosensitive polymer of the invention may include any constitutional unit (hereinafter, "any other constitutional unit) other than the constitutional unit represented by formula (1) and the constitutional unit represented by formula (2), in addition to the constitutional unit represented by formula (1) and the constitutional unit represented by formula (2).

As the "any other constitutional unit," a constitutional unit derived from an industrially available monomer that allows a radical polymerization reaction can be used, more specifically, a constitutional unit formed by opening a π bond that constitutes a polymerization-reactive multiple bond such as an ethylenic unsaturated double bond as included in an industrially available monomer that allows a radical polymerization reaction can be used. Specific examples are shown below, but the invention is not limited by the specific examples.

Specific examples of a constitution in the monomer that allows formation of any other constitutional unit, and the industrially available monomer that allows the radical polymerization reaction include a compound having at least one ethylenic unsaturated double bond. Specific examples thereof include (meth)acrylic acid or a derivative thereof, such as (meth)acrylic acid, methyl (meth)acrylate, ethyl (meth)acrylate, butyl (meth)acrylate, 2-ethylhexyl(meth)acrylate, phenyl (meth)acrylate and benzyl (meth)acrylate;

hydroxy alkyl esters such as 2-hydroxyethyl(meth)acrylate, 2-hydroxypropyl(meth)acrylate, 2-hydroxybutyl(meth)acrylate and 3-hydroxypropyl(meth)acrylate;

a monofunctional (meth)acrylate compound such as ω-carboxypolycaprolactone mono(meth)acrylate, hydroxyethyl mono(meth)acrylate phthalate and 2-hydroxy-3-phenoxypropyl(meth)acrylate;

a polyfunctional (meth)acrylate compound such as 1,4-butanediol di(meth)acrylate, 1,6-hexanediol di(meth)acrylate, ethylene glycol di(meth)acrylate, neopentyl glycol di(meth)acrylate, diethylene glycol di(meth)acrylate, triethylene glycol di(meth)acrylate, polyethylene glycol di(meth)acrylate, hydroxypivalate neopentyl glycol di(meth)acrylate, trimethylolpropane tri(meth)acrylate, ethoxylated trimethylolpropane tri(meth)acrylate, ditrimethylol propane tetra(meth)acrylate, pentaerythritol di(meth)acrylate, pentaerythritol tri(meth)acrylate, pentaerythritol tetra(meth)acrylate, dipentaerythritol penta(meth)acrylate, dipentaerythritol hexa(meth)acrylate, dicyclopentanyl di(meth)acrylate, ethoxylated hydrogenated bisphenol A di(meth)acrylate, ethoxylated bisphenol A di(meth)acrylate, ethoxylated bisphenol F di(meth)acrylate, ethoxylated bisphenol S di(meth)acrylate, hydroxypropyl di(meth)acrylate, diethylene glycol bishydroxypropyl (meth)acrylate and monohydroxypentaerythritol tri(meth)acrylate; and a (meth)acrylate compound having a cyclic ether group such as glycidyl (meth)acrylate, (3-methyl-3-oxetanyl)methyl (meth)acrylate and (3-ethyl-3-oxetanyl)methyl(meth)acrylate.

As the monomer that allows formation of any other constitutional unit, and the industrially available monomer that allows the radical polymerization reaction, a commercial item monofunctional or polyfunctional (meth)acrylate compound can be used as is. Specific examples include ARONIX (registered trademark) M-5400 (monohydroxyethyl acrylate phthalate) made by Toagosei Chemical Industry Co., Ltd., ditto M-5700 (2-hydroxy-3-phenoxypropyl acrylate), ditto M-215 (isocyanuric acid ethylene oxide-modified diacrylate), ditto M-220 (tripropylene glycol diacrylate), ditto M-245 {polyethylene glycol (n≈9) diacrylate}, ditto M-305 (pentaerythritol triacrylate), ditto M-309 (trimethylolpropane triacrylate), ditto M-315 (isocyanuric acid ethylene oxide-modified triacrylate), ditto M-400 {a mixture of dipentaerythritol pentaacrylate and dipentaerythritol hexaacrylate (main component)}, ditto M-450 (pentaerythritol tetraacrylate), ditto M-8060 and ditto M-8560;

Biscoat #295 (trimethylolpropane triacrylate) made by Osaka Organic Chemical Industry Ltd., ditto #300 (pentaerythritol triacrylate), ditto #360 (trimethylolpropane ethylene oxide-modified triacrylate) and ditto #400 (pentaerythritol tetraacrylate);

KAYARAD (registered trademark) TMPTA (trimethylolpropane triacrylate) made by Nippon Kayaku Co., Ltd., ditto PET-30 (pentaerythritol triacrylate), ditto DPHA {a mixture of dipentaerythritol pentaacrylate and dipentaerythritol hexaacrylate (main component)}, ditto D-310 (dipentaerythritol pentaacrylate), ditto D-330 and ditto DPCA-60.

Furthermore, a (meth)acrylate compound such as Sila-Ace (registered trademark) S-710 (3-methacryloxypropyl trimethoxysilane), and Silaplane (registered trademark) FM-0711, FM-0721 and FM-0725 as made by JNC Corporation can also be used.

The compounds can be used in one kind only or in combination with two or more kinds. The photosensitive polymer used in the invention can include such any other constitutional unit, when the total number of moles of a sum of the constitutional unit represented by formula (1) and the constitutional unit represented by formula (1) is taken as 100, in a ratio of approximately 30 to approximately 0.1 mol, and preferably, approximately 10 to approximately 0.1 mol.

In the invention, as the monomer that allow formation of "any other constitutional unit," when necessary, a polymerizable liquid crystal compound having (meth)acrylate, "photosensitizer having a polymerizable group" described later in a section of "additive" can also be further used in addition to "industrially available monomer that allows the radical polymerization reaction.

Weight average molecular weight of such a photosensitive polymer is preferably approximately 1,000 or more and approximately 500,000 or less, and further preferably, approximately 1,000 or more and approximately 200,000 or less. Here, the weight average molecular weight can be measured as a value of polystyrene (PS) equivalent using gel permeation chromatography (GPC).

A method for manufacturing the photosensitive polymer is not particularly limited, and an industrially applied general-purpose method can be applied. Specifically, the photosensitive polymer can be manufactured by a cationic polymerization method, a radical polymerization method or an anionic polymerization method utilizing an ethylenic unsaturated double bond included in each of vinyl in a constitutional monomer, more specifically, a monomer that allows formation of the constitutional unit represented by formula (1), a monomer that allows formation of the constitutional unit represented by formula (2), and a monomer that allows formation of any other constitutional unit. Among the methods, from a viewpoint of ease of reaction control, or the like, a radical polymerization method is particularly preferred.

When the photosensitive polymer has one or more kinds of monomers as the constitutional unit, a random copolymer, a block copolymer or a graft copolymer can be formed from a sequence of the constitutional unit. The sequence of the constitutional unit is not particularly limited, but in view of ease of the polymerization method, a random copolymer is particularly preferred.

In the invention, the photosensitive polymer can be suitably obtained by allowing radical polymerization of, in the presence of a suitable polymerization initiator, a monomer that allows formation of the constitutional unit represented by formula (1), and a monomer that allows formation of the constitutional unit represented by formula (2) used when necessary, and a monomer that allows formation of any other constitutional unit.

As the polymerization initiator for radical polymerization, a publicly known compound such as a radical thermal polymerization initiator and a radical photopolymerization initiator can be used.

The radical thermal polymerization initiator is a compound that generates a radical by heating the initiator at decomposition temperature or higher. Specific examples of such a radical thermal polymerization initiator include ketone peroxides such as a methyl ethyl ketone peroxide and a cyclohexanone peroxide; diacyl peroxides such as an acetyl peroxide and a benzoyl peroxide; hydroperoxides such as a hydrogen peroxide, a tert-butyl hydroperoxide and a cumene hydroperoxide; dialkyl peroxides such as a di-tert-butyl-peroxide, a dicumyl peroxide and a dilauroyl peroxide; peroxy ketals such as dibutylperoxycyclohexane, alkyl peresters such as peroxy neodecanoate-tert-butyl ester, peroxy pivalate-tert-butyl ester and peroxy-2-ethylcyclohexanate-tert-amyl ester; persulfates such as potassium persulfate, sodium persulfate and ammonium persulfate; and an azo compound such as azobisisobutyronitrile and 2,2'-di(2-hydroxyethyl) azobisisobutyronitrile. Such a radical thermal polymerization initiator can also be used in one kind only or in combination with two or more kinds.

The radical photopolymerization initiator is not particularly limited as long as the initiator is a compound that initiates radical polymerization by irradiation with light. Specific examples of such a radical photopolymerization initiator include benzophenone, Michler's ketone, 4,4'-bis(diethylamino)benzophenone, xanthone, thioxanthone, isopropyl xanthone, 2,4-diethylthioxanthone, 2-ethylanthraquinone, acetophenone, 2-hydroxy-2-methylpropiophenone, 2-hydroxy-2-methyl-4'-isopropylpropiophenone, 1-hydroxycyclohexylphenyl ketone, isopropyl benzoin ether, isobutyl benzoin ether, 2,2-diethoxyacetophenone, 2,2-dimethoxy-2-phenylacetophenone, camphorquinone, benzanthrone, 2-methyl-1-[4-(methylthio)phenyl]-2-morpholinopropane-1-one, ethyl 2-benzyl-2-dimethylamino-1-(4-morpholinophenyl)-butanone-1,4-dimethylamino benzoate, isoamyl 4-dimethylamino benzoate, 4,4'-di(t-butylperoxycarbonyl)benzophenone, 3,4,4'-tri(t-butylperoxycarbonyl)benzophenone, 2,4,6-trimethylbenzoyldiphenyl phosphine oxide, 2-(4'-methoxystyryl)-4,6-bis(trichloromethyl)-s-triazine, 2-(3',4'-dimethoxystyryl)-4,6-bis(trichloromethyl)-s-triazine, 2-(2',4'-dimethoxy styryl)-4,6-bis(trichloromethyl)-s-triazine, 2-(2'-methoxystyryl)-4,6-bis(trichloromethyl)-s-triazine, 2-(4'-pentyloxystyryl)-4,6-bis(trichloromethyl)-s-triazine, 4-[p-N,N-di(ethoxycarbonylmethyl)]-2,6-di(trichloromethyl)-s-triazine, 1,3-bis(trichloromethyl-5-(2'-chlorophenyl)-s-triazine, 1,3-bis(trichloromethyl)-5-(4'-methoxyphenyl)-s-triazine, 2-(p-dimethylaminostyryl)benzoxazole, 2-(p-dimethylaminostyryl)benzthiazole, 2-mercaptobenzothiazole, 3,3'-carbonylbis(7-diethylamino coumarin), 2-(o-chlorophenyl)-4,4',5,5'-tetraphenyl-1,2'-biimidazole, 2,2'-bis(2-chlorophenyl-4,4',5,5'-tetrakis(4-ethoxycarbonylphenyl)-1,2'-biimidazole, 2,2'-bis(2,4-dichlorophenyl)-4,4',5,5'-tetraphenyl-1,2'-biimidazole, 2,2'-bis(2,4-dibromophenyl-4,4',5,5'-tetraphenyl-1,2'-biimidazole, 2,2'-bis(2,4,6-trichlorophenyl-4,4',5,5'-tetraphenyl-1,2'-biimidazole, 3-(2-methyl-2-dimethylaminopropionyl)carbazole, 3,6-bis(2-methyl-2-morpholinopropionyl-9-n-dodecylcarbazole, 1-hydroxycyclohexyl phenyl ketone, bis(5-2,4-cyclopentadiene-1-yl)-bis(2,6-difluoro-3-(1H-pyrrole-1-yl)-phenyl)titanium, 3,3',4,4'-tetra(t-butylperoxycarbonyl)benzophenone, 3,3',4,4'-tetra(t-hexylperoxycarbonyl)benzophenone, 3,3'-di(methoxycarbonyl)-4,4'-di(t-butylperoxycarbonyl)benzophenone, 3,4'-di(methoxycarbonyl)-4,3'-di(t-butylperoxycarbonyl)benzophenone, 4,4'-di(methoxycarbonyl)-3,3'-di(t-butylperoxycarbonyl)benzophenone, 2-(3-methyl-3H-benzothiazole-2-ylidene)-1-naphthalene-2-yl-ethanone or 2-(3-methyl-1,3-benzothiazole-2(3H)-ylidene)-1-(2-benzoyl)ethanone. The compounds may be used alone or in combination with two or more compounds.

The radical polymerization is not particularly restricted, and an emulsion polymerization method, a suspension polymerization method, a dispersion polymerization method, a precipitation polymerization method, a bulk polymerization method, a solution polymerization method or the like can be applied. With regard to any other polymerization method, a similar explanation is made, and a detail thereof is described in "Synthesis of Polymers (First Volume) (Kobunshi no Gosei (Jyo) in Japanese) (edited by Takeshi Endo, Kodansha, issued in 2010), or the like. A summary of the solution polymerization method being a general radical polymerization method will be explained below.

The solution polymerization method means a process for performing a reaction in which polymerization is performed in a solvent using an oil-soluble polymerization catalyst. The organic solvents can be arbitrarily selected within the range suitable for the object and the advantageous effects of the invention. The organic solvents are an organic compound having a boiling point under atmospheric pressure within the range of approximately 50 to approximately 200° C., preferably, an organic compound to uniformly dissolve the monomer, components or the like produced during a polymerization process.

The organic solvent used herein may be used if the solvent has no inhibitory action on radical polymerization, and specific examples preferably include an aromatic compound such as benzene, toluene, xylene and ethylbenzene; an aliphatic compound such as pentane, hexane, heptane, octane, cyclohexane and a cycloheptane; an alcohol such as methanol, ethanol, 1-propanol, 2-propanol, and ethylene glycol; ethers such as dibutyl ether, ethylene glycol monomethyl ether, ethylene glycol dimethyl ether, tetrahydrofuran and dioxane; ketones such as acetone, methyl ethyl ketone, methyl isobutyl ketone and cyclohexanone; and esters such as ethyl acetate, butyl acetate, amyl acetate and γ-butyrolactone. In addition, the organic solvents can be used in one kind only or in combination with two or more kinds.

Solution polymerization conditions are not particularly restricted, either. The solution polymerization is preferably performed, for example, within a temperature range of approximately 50 to approximately 200° C. for approximately 10 minutes to approximately 20 hours. So as to avoid deactivation of radicals generated, the solution polymerization is preferably performed under an atmosphere of an inert gas such as nitrogen obviously during the solution polymerization and also before initiation of the solution polymerization.

In order to control molecular weight of the photosensitive polymer or uniformize a molecular weight distribution thereof or accelerate polymerization, a radical polymerization method using a chain transfer agent is particularly effective. A polymer in a preferred molecular weight range and having a further uniform molecular weight distribution can be obtained by using the chain transfer agent.

As the chain transfer agent, such a compound can be used as mercaptans including β-mercaptopropionic acid, methyl β-mercaptopropionate, isopropylmercaptan, octylmercaptan, decylmercaptan, dodecylmercaptan, tert-dodecylmercaptan, octadecylmercaptan, thiophenol, p-nonylthiophenol, thiosalicylic acid, mercaptoacetic acid and mercapto; polyhalogenated alkyl including carbon tetrachloride, chloroform, butyl chloride, 1,1,1-trichloroethane and 1,1,1-tribromooctane; and low-activity monomers including α-methylstyrene and α-methylstyrene dimer. An amount of use of the chain transfer agents can be determined depending on activity of the chain transfer agent, a combination of monomers, a solvent, temperature or other polymerization conditions. The amount is ordinarily in the range of approximately 0.01 mol % to approximately 50 mol % based on the total number of moles of monomers to be used.

Additive

The photoalignable phase difference agent of the invention is used, not alone, but is formed on a substrate and thus used. With regard to the phase difference film formed of the photoalignable phase difference agent, characteristics necessary for an optical film or an optical display device, such as good alignment properties, adhesion with a substrate, application uniformity, chemical resistance, heat resistance, transmittance and gas barrier properties, are required. An additive can be used in order to provide the film with such characteristics.

An amount of addition of the additive is determined according to required characteristics, but preferably in the range of approximately 0.01 to approximately 10 parts by weight based on 100 parts by weight of the photosensitive polymer of the invention.

Specific examples of the additive include an acrylic, styrenic, polyethyleneimine-based or urethane-based polymer dispersing agent, an anionic, cationic, nonionic or fluorine-based surfactant, an applicability improver such as a silicone resin, an adhesion improver such as a silane coupling agent, an ultraviolet light absorber such as alkoxy benzophenones, an agglomeration inhibitor such as sodium polyacrylate, a thermal crosslinking agent such as an oxirane compound, a melamine compound or a bisazide compound, and an alkali solubility accelerator such as organic carboxylic acid.

As the additive, a photosensitizer can also be used. A colorless sensitizer and a triplet sensitizer are preferred.

Specific examples of the photosensitizer include an aromatic nitro compound, coumarin (7-diethylamino-4-methylcoumarin, 7-hydroxy-4-methylcoumarin, ketocoumarin and carbonylbiscoumarin), aromatic 2-hydroxyketone, and amino-substituted, aromatic 2-hydroxyketone (2-hydroxybenzophenone, or mono- or di-p-(dimethylamino)-2-hydroxybenzophenone), acetophenone, anthraquinone, xanthone, thioxanthone, benzanthrone, thiazoline (2-benzoylmethylene-3-methyl-β-naphthothiazoline, 2-(β-naphthoylmethylene)-3-methylbenzothiazoline, 2-(α-naphthoylmethylene)-3-methylbenzothiazoline, 2-(4-biphenoylmethylene)-3-methylbenzothiazoline, 2-(β-naphthoylmethylene)-3-methyl-β-naphthothiazoline, 2-(4-biphenoylmethylene)-3-methyl-β-naphthothiazoline, 2-(p-fluorobenzoylmethylene)-3-methyl-β-naphthothiazoline), oxazoline (2-benzoylmethylene-3-methyl-β-naphthoxazoline, 2-(β-naphthoylmethylene)-3-methylbenzoxazoline, 2-α-naphthoylmethylene)-3-methylbenzoxazoline, 2-(4-biphenoylmethylene)-3-methylbenzoxazoline, 2-(6-naphthoylmethylene)-3-methyl-β-naphthoxazoline, 2-(4-biphenoylmethylene)-3-methyl-β-naphthoxazoline, 2-(p-fluorobenzoylmethylene)-3-methyl-β-naphthoxazoline), benzothiazole, nitroaniline (m- or p-nitroaniline, 2,4,6-trinitroaniline) or nitroacenaphthene (5-nitroacenaphthene), (2-[(m-hydroxy-p-methoxy)styryl]benzothiazole, benzoin alkyl ether, N-alkylated phthalone, acetophenone ketal (2,2-dimethoxyphenylethanone), naphthalene, anthracene (2-naphthalene methanol, 2-naphthalene carboxylic acid), 9-anthracene methanol, 9-anthracene carboxylic acid, benzopyran, azoindolizine and furocoumarin.

Specific examples of preferred photosensitizers include aromatic 2-hydroxyketone (benzophenone), coumarin, ketocoumarin, carbonylbiscoumarin, acetophenone, anthraquinone, xanthone, thioxanthone and acetophenone ketal.

As the additive, a photosensitizer can also be used. A colorless sensitizer and a triplet sensitizer are preferred.

Specific examples of the photosensitizer include an aromatic nitro compound, coumarin (7-diethylamino-4-methylcoumarin, 7-hydroxy-4-methylcoumarin, ketocoumarin and carbonylbiscoumarin), aromatic 2-hydroxyketone, and amino-substituted, aromatic 2-hydroxyketone (2-hydroxybenzophenone, or mono- or di-p-(dimethylamino)-2-hydroxybenzophenone), acetophenone, anthraquinone, xanthone, thioxanthone, benzanthrone, thiazoline (2-benzoylmethylene-3-methyl-β-naphthothiazoline, 2-(β-naphthoylmethylene)-3-methylbenzothiazoline, 2-(α-naphthoylmethylene)-3-methylbenzothiazoline, 2-(4-biphenoylmethylene)-3-methylbenzothiazoline, 2-(β-naphthoylmethylene)-3-methyl-β-naphthothiazoline, 2-(4-biphenoylmethylene)-3-methyl-β-naphthothiazoline, 2-(p-fluorobenzoylmethylene)-3-methyl-β-naphthothiazoline), oxazoline (2-benzoylmethylene-3-methyl-β-naphthoxazoline, 2-(β-naphthoylmethylene)-3-methylbenzoxazoline, 2-α-naphthoylmethylene)-3-methylbenzoxazoline, 2-(4-biphenoylmethylene)-3-methylbenzoxazoline, 2-(β-naphthoylmethylene)-3-methyl-β-naphthoxazoline, 2-(4-biphenoylmethylene)-3-methyl-β-naphthoxazoline, 2-(p-fluorobenzoylmethylene)-3-methyl-β-naphthoxazoline), benzothiazole, nitroaniline (m- or p-nitroaniline, 2,4,6-trinitroaniline) or nitroacenaphthene (5-nitroacenaphthene), (2-[(m-hydroxy-p-methoxy)styryl]benzothiazole, benzoin alkyl ether, N-alkylated phthalone, acetophenone ketal (2,2-dimethoxyphenylethanone), naphthalene, anthracene (2-naphthalene methanol, 2-naphthalene carboxylic acid), 9-anthracene methanol, 9-anthracene carboxylic acid, benzopyran, azoindolizine and furocoumarin.

Specific examples of preferred photosensitizers include aromatic 2-hydroxyketone (benzophenone), coumarin, ketocoumarin, carbonylbiscoumarin, acetophenone, anthraquinone, xanthone, thioxanthone and acetophenone ketal.

Hereinafter, specific examples of the constitutional unit derived from the photosensitizer having the polymerizable group are shown. However, the invention is not limited by the specific examples.

Formula 9

In the compounds, $R^3$ is independently hydrogen or methyl; and q is independently an integer from 1 to 12.

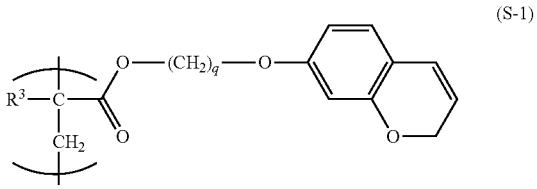

(S-1)

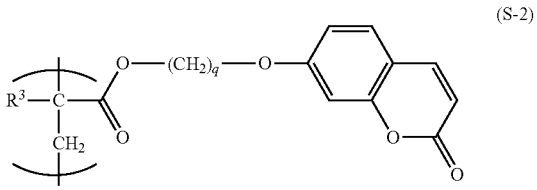

(S-2)

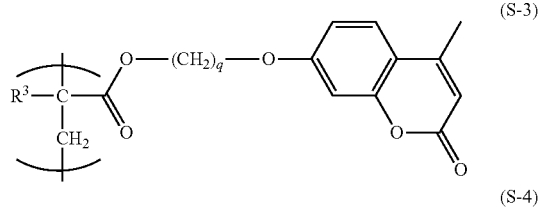

(S-3)

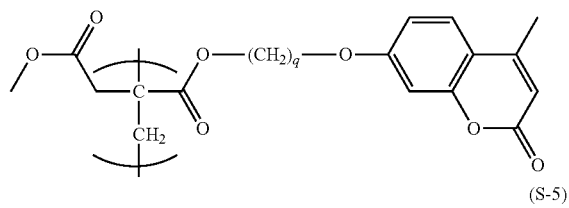

(S-4)

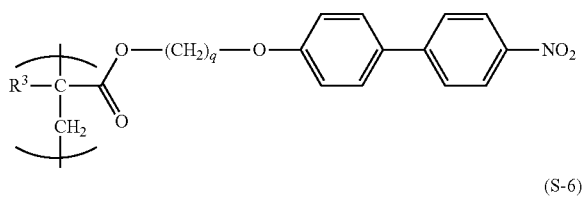

(S-5)

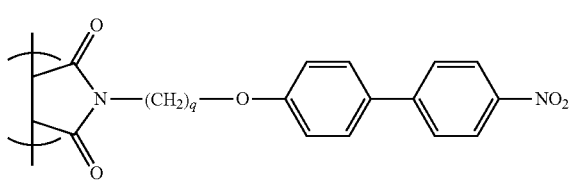

(S-6)

In the compounds, $R^3$ is independently hydrogen or methyl; and q is independently an integer from 1 to 12.

In the invention, the constitutional unit derived from "photosensitizer having the polymerizable group" may be included in the photosensitive polymer, when the total number of moles of a sum of the constitutional unit represented by formula (1) and the constitutional unit represented by formula (1) is taken as 100, in a ratio of approximately 30 to approximately 1 mol, and preferably, approximately 5 to approximately 1 mol.

As the additive, a silane coupling agent can be used in order to improve adhesion with the substrate. As the coupling agent, a silane-based compound, an aluminum-based compound and a titanate-based compound are used. Specific examples include a silane-based compound such as 3-glycidoxypropyldimethylethoxysilane, 3-glycidoxypropylmethyldiethoxysilane and 3-glycidoxypropyltrimethoxysilane, an aluminum-based compound such as acetoalkoxyaluminum diisopropylate and a titanate-based compound such as tetraisopropylbis(dioctylphosphite)titanate.

As the additive, a surfactant can be used in order to improve wettability to a base substrate, levelability and applicability. As the surfactant, a silicone-based surfactant, an acrylic surfactant, a fluorine-based surfactant or the like is used. Specific examples include a silicone-based surfactant such as Byk (registered trademark)-300, ditto 306, ditto 335, ditto 310, ditto 341, ditto 344 and ditto 370 as made by BYK-Chemie GmbH, an acrylic surfactant such as Byk (registered trademark)-354, ditto 358 and ditto 361 as made by BYK-Chemie GmbH and a fluorine-based surfactant such as SC-101 made by Asahi Glass Co., Ltd., and EF-351 and ditto 352 as made by Tohchem Products Corporation.

The photoalignable phase difference agent of the invention may contain a liquid crystalline low-molecular-weight compound for the purpose of adjusting a liquid crystal temperature range, optical anisotropy or the like. Among the liquid crystalline low-molecular-weight compounds, a compound having a polymerizable group is preferred.

Phase Difference Film or the Like

The photoalignable phase difference agent of the invention as described above can be suitably used as a phase difference film, although the use is not particularly limited. In the invention, the phase difference film can be obtained by irradiating a coating film formed from the a photoalignable phase difference agent of the invention with light including linearly polarized light, and further heating the resulting film to provide the film with optical anisotropy.

Herein, the photoalignable phase difference agent of the invention is typically used as an application liquid in which the photosensitive polymer of the invention is dissolved into an organic solvent.

As the organic solvent used during dissolution, a solvent used during polymerization for manufacturing the photosensitive polymer may be used as is, or the solvent during polymerization may be once removed, and a new solvent may be used afresh. Specific examples of the organic solvent used afresh during dissolution include an aromatic compound such as benzene, toluene, xylene and ethylbenzene; an aliphatic compound such as pentane, hexane, heptane, octane, cyclohexane and cycloheptane; alcohols such as methanol, ethanol, 1-propanol, 2-propanol and ethylene glycol; ethers such as dibutyl ether, ethylene glycol monomethyl ether, ethylene glycol dimethyl ether, tetrahydrofuran and dioxane; ketones such as acetone, methyl ethyl ketone, methyl isobutyl ketone and cyclohexanone; and esters such as ethyl acetate, butyl acetate, amyl acetate and γ-butyrolactone. From a viewpoint of toxicity or an environmental load, 1-propanol, 2-propanol, 1-methoxy-2-propanol, ethylene glycol, diethylene glycol, 2-butioxyethenol, 3-methoxy-3-methylbutanol, ethylene glycol monomethyl ether, ethylene glycol dimethyl ether, methyl ethyl ketone, methyl isobutyl ketone, isophorone, cyclohexanone, cyclopentanone, propylene glycol monoethyl ether acetate, ethylene glycol monobutyl ether acetate, butyl acetate or the like is preferred. Moreover, from a viewpoint of solvent resistance to a plastic substrate, 1-methoxy-2-propanol, methyl isobutyl ketone, cyclohexanone, cyclopentanone or the like is preferred. In addition, the organic solvents can be used in one kind only or in combination with two or more kinds.

Then, in the invention, the phase difference film can be obtained by applying on a substrate such a photoalignable phase difference agent by a known method (a spin coating method, a gravure coater method, a reverse gravure method, a Mayer bar coater method, a die coater method, a reverse roll coater method, a fountain reverse roll coater method, a kiss contact roller coater method, a bar coater method, a knife coater method, a lip coater method, a resist coater method, for example), removing the organic solvent, and then applying alignment treatment to the resulting coating film by irradiation with polarized light, and then heat treatment.

On the occasion, irradiation of the coating film with polarized light is performed for aligning the photosensitive polymer of the invention, and performed by irradiating the film with light from a single direction. An alignment axis is formed in the photoalignable phase difference agent by irradiation with light. On the occasion, as irradiation light, X-rays, an electron beam, ultraviolet light, visible light or infrared light (heat rays) is used, and ultraviolet light is particularly preferably used. A wavelength of ultraviolet light is preferably approximately 400 nanometers or less, and further preferably, in the range of approximately 180 to approximately 360 nanometers. As a light source, a low-pressure mercury lamp, a high-pressure mercury lamp, an ultra-high pressure mercury lamp, a high-pressure discharge lamp or a short arc discharge lamp is preferably used. In general, the coating film is irradiated with linearly polarized light, but an alignment function may be provided in some cases by irradiation with unpolarized light. However, linearly polarized light is particularly preferably used so as to further positively allow provision of the alignment function. Irradiance is preferably in the range of approximately 10 mJ/cm$^2$ to approximately 20,000 mJ/cm$^2$, and most preferably, in the range of approximately 20 mJ/cm$^2$ to approximately 5,000 mJ/cm$^2$. Here, when a photosensitive polymer having both the constitutional unit represented by formula (1) and the constitutional unit represented by formula (2) is used as the photoalignable phase difference agent of the invention, the irradiation with light tends to be allowed with low irradiance.

Moreover, heat treatment to the coating film subjected to irradiation with polarized light is performed for further uniformly aligning a photoalignable phase difference agent in which the alignment axis is formed by irradiation with polarized light irradiation, thereby allowing obtaining of the phase difference film. On the occasion, heating temperature T is preferably, when a lower limit and an upper limit are taken as Tm and Ti, respectively, in the range:

$Tm-80°\,C.\leq T \leq Ti.$

In general, the temperature T is in the range of approximately 60° C. to approximately 250° C., and preferably, in the range of approximately 80° C. to approximately 150° C. In addition, Tm is transition temperature between a crystal phase and a liquid crystal phase or glass transition temperature of the polymer, and Ti corresponds to transition temperature between a liquid crystal phase and an isotropic phase.

When the substrate prepared by applying the photoalignable phase difference agent of the invention is irradiated with linearly polarized light in a normal line direction, isomerization and/or dimerization of the photosensitive group arranged along an electric field vibrating direction of linearly polarized light is selectively caused. Then, alignment is caused in a polarization direction of linearly polarized light or in a direction perpendicular to polarized light by heat treatment.

In addition, in order to immobilize induced alignment, irradiation with light may be performed again after heat treatment. Light for immobilizing alignment preferably includes ultraviolet light, and may be linearly polarized light or unpolarized light.

The phase difference film of the invention is obtained by applying onto a transparent substrate a photoalignable phase difference agent containing a photosensitive polymer showing liquid crystallinity, and various compounds added when necessary in addition thereto, irradiating the resulting coating film with light, and heating to align the photosensitive polymer showing liquid crystallinity. The phase difference film of the invention shows optical anisotropy developed by photoalignment of the photosensitive polymer.

Here, in the invention, thickness of the phase difference film is preferably adjusted in the range of approximately 0.5 micrometers to approximately 10 micrometers.

Furthermore, an optical film can be obtained using the phase difference film of the invention. Here, the optical film of the invention means a phase difference film or an optical compensation film for achieving an improvement in contrast or extension of the viewing angle range in the liquid crystal display device. Such an optical film is specifically formed of the phase difference film of the invention. The phase difference film itself of the invention may be directly used as the optical film, or may be an optical film formed by combining any other film with the phase difference film of the invention.

Furthermore, a dichroic dye may be added to the photoalignable phase difference agent of the invention. The photoalignable phase difference agent containing the dichroic dye can be utilized for an information recording device, a polarization film, an anti-counterfeit medium or the like.

Laminate

The phase difference film of the invention has capability to align a liquid crystal material. Therefore, application of a polymerizable liquid crystal, a liquid crystalline polymer or the like onto the phase difference film easily allows shaping a laminate of films having optical anisotropy. As the laminate, a polymerizable liquid crystal material is further preferably used from ease of coating properties, height of alignment uniformity, or the like. Specific examples of the polymerizable liquid crystal material include a polymerizable liquid crystal composition containing a liquid crystalline (meth) acrylic compound having at least one polymerizable group in a molecule, a liquid crystalline oxirane compound and a liquid crystalline oxetane compound. Among the compounds, a polymerizable liquid crystal composition using a liquid crystalline (meth)acryl compound is further preferably used.

Hereinafter, specific examples of the polymerizable liquid crystal compound are shown. However, the invention is not limited by the specific examples.

Formula 10

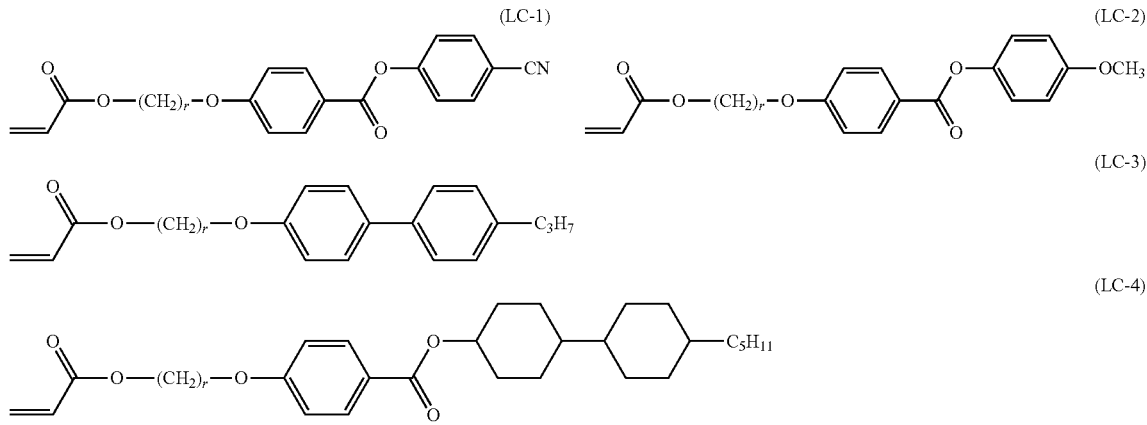

-continued

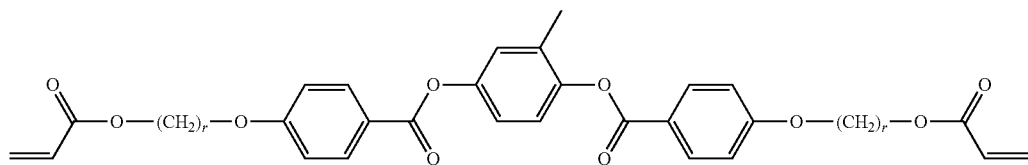
(LC-5)

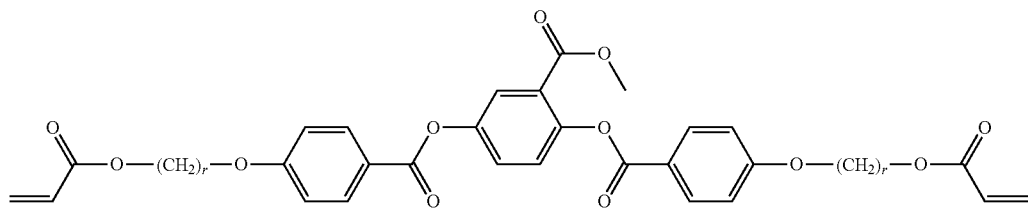
(LC-6)

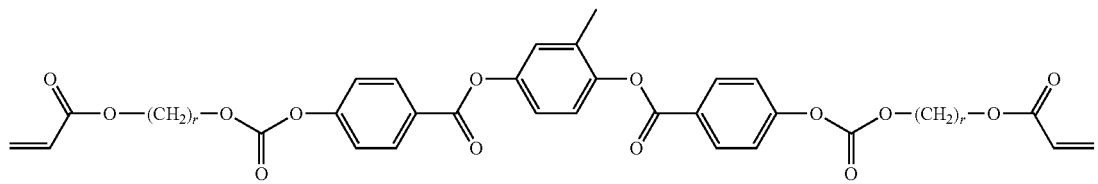
(LC-7)

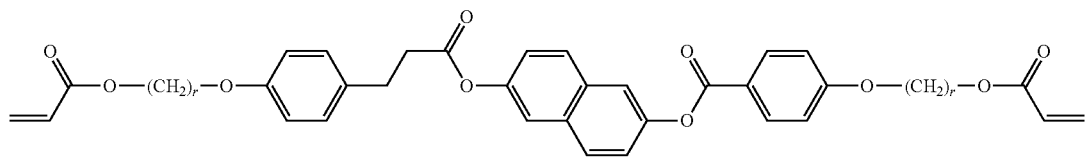
(LC-8)

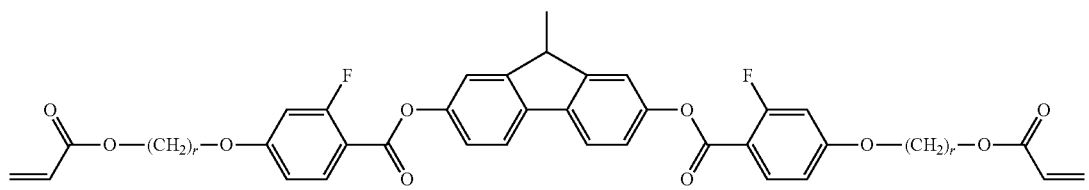
(LC-9)

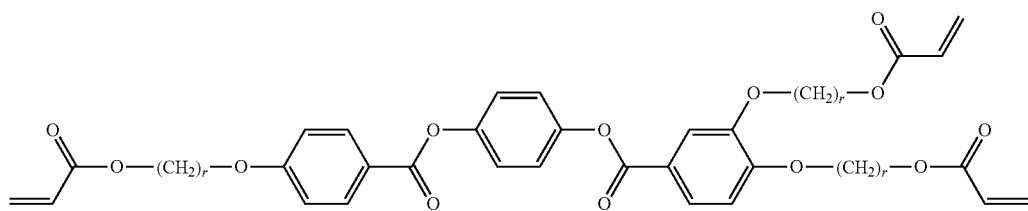
(LC-10)

In compounds of (LC-1) to (LC-10), r is independently an integer from 1 to 12.

The optical film of the invention is useful as various kinds of optical members and a display device such as a liquid crystal display device, and other optical devices. It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents. The following examples are for illustrative purposes only and are not intended, nor should they be interpreted, to limit the scope of the invention.

EXAMPLES

Hereinafter, the invention will be explained more specifically by way of Examples, but the invention is not restricted by the Examples. Structure of a compound was confirmed by a nuclear magnetic resonance spectrum, an infrared absorption spectrum and a mass spectrum. A unit of phase transition temperature is degree Centigrade (° C.), and a symbol C stands for crystals, a symbol G stands for a glass state, a symbol S stands for a smectic phase, a symbol N stands for a nematic phase, and a symbol l stands for an isotropic liquid phase. In the following, methods for measuring physical properties will be presented.

Confirmation of Structure of a Compound

Structure of a compound synthesized was confirmed by measurement of 500 MHz proton NMR (Bruker: DRX-500).

A numeric value described is expressed in terms of ppm, and s, d, t and m stand for a singlet, a doublet, a triplet and a multiplet, respectively.

Phase Transition Temperature

A sample was placed on a hot plate in a melting point apparatus equipped with a polarizing microscope and was heated at a rate of 10° C. per minute. Temperature at which a phase was transited to another phase was measured. A symbol C means crystals, a symbol G means a glass state, a symbol N means a nematic phase and a symbol 1 means an isotropic liquid. An NI point is a maximum temperature of the nematic phase or transition temperature from the nematic phase to the isotropic liquid. "C 50 N 63 I" represents that transition was made from the crystals to the nematic phase at 50° C., and from the nematic phase to the isotropic liquid at 63° C. A phase in a parenthesis represents a monotropic liquid crystal phase.

Weight Average Molecular Weight (Mw) and Polydispersity (Mw/Mn)

Shimadzu LC-9A Gel Permeation Chromatograph (GPC) made by Shimadzu Corporation and a column Shodex (registered trademark) GF-7M HQ (eluent: DMF or THF, and a standard reference material: polystyrene having known molecular weight) made by Showa Denko K.K. were used.

Copolymerization Ratio

A reaction conversion rate in a polymerization reaction was detected from an amount of unreacted monomer by gas chromatography (GC) or liquid chromatography, and a copolymerization ratio was calculated using the reaction conversion rate and/or NMR.

Alignment of a Phase Difference Film
Confirmation was made by methods described below.
(1) Visual Observation Method A substrate having a phase difference film formed thereon was interposed between two polarizing plates arranged in a crossed nicol, and a state thereof was observed, and the substrate was rotated in a horizontal plane, and a bright and dark state was confirmed. The substrate having the phase difference film formed thereon was observed using a polarizing microscope, and presence or absence of an alignment defect was confirmed.
(2) Measurement by an Ellipsometer OPTIPRO (registered trademark) ellipsometer made by Shintech, Inc. was used, and a substrate having a phase difference film formed thereon was irradiated with light having a wavelength of 550 nanometers. While an incident angle of light was reduced from 90 degrees relative to a film surface, retardation was measured. Retardation is expressed in terms of $\Delta n$ d. A symbol $\Delta n$ is a value of optical anisotropy and a symbol d is thickness of a polymer film.

Film Thickness Measurement

A layer of a phase difference film was shaved off from a substrate, and a profile was measured using a high-resolution surface profiler (Alpha-Step IQ made by KLA-Tencor Corporation).

Evaluation of a Value of Optical Anisotropy ($\Delta n$)

From retardation and a value of film thickness as determined on a layer of a phase difference film layer, and $\Delta n$ was calculated from an equation: $\Delta n$=retardation/film thickness.

Example 1

(i) Synthesis of Compound (M-1)

Compound (M-1) was synthesized according to a scheme described below.
Sss

Formula 11

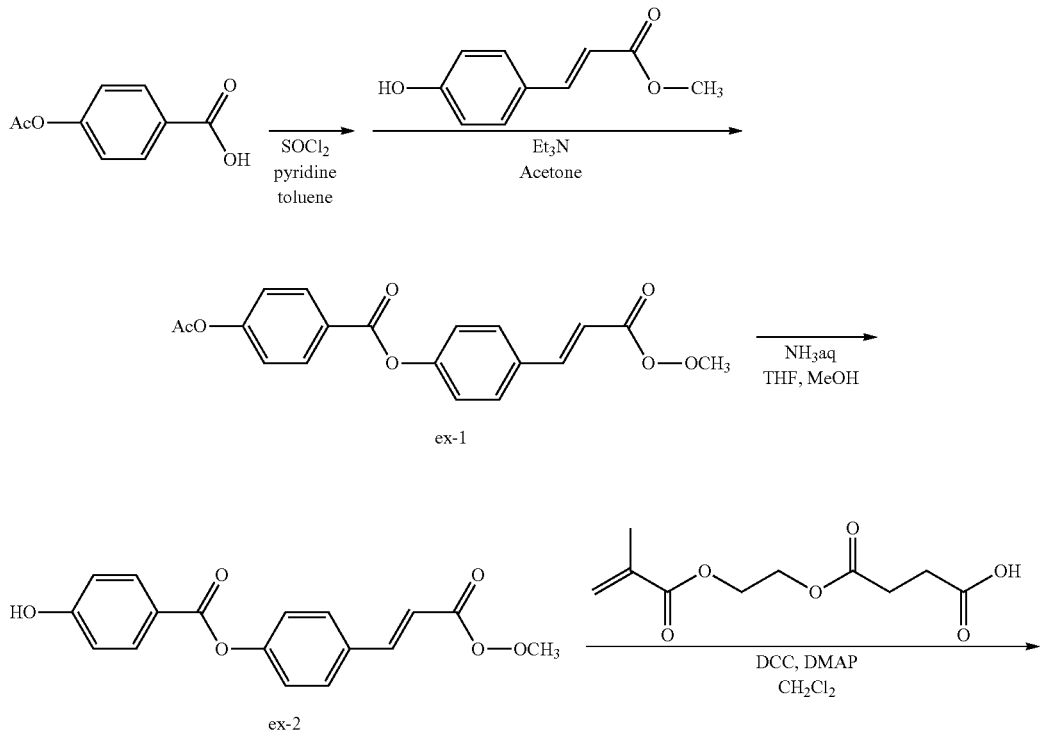

-continued

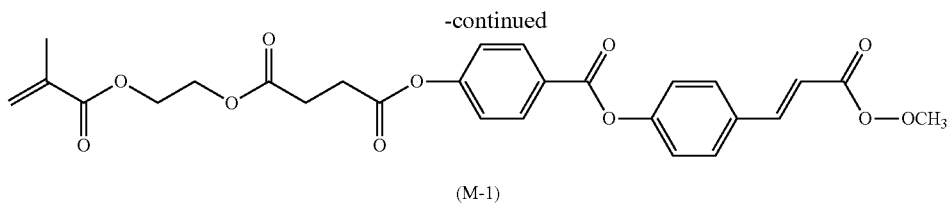

(M-1)

Hereinafter, synthesis of compound (M-1) will be more specifically explained.

(First Stage: Synthesis of Compound (Ex-1))

To 250 mL of toluene, 50 g of p-acetoxybenzoic acid was added, and 0.2 g of pyridine was added thereto, and the resulting mixture was stirred while being heated at 60° C. Thereto, 39.6 g of thionyl chloride was added dropwise. After dropwise addition, the resulting mixture was stirred at 60° C. for 4 hours. A solvent was distilled off under reduced pressure, 250 mL of toluene was added again to the resulting residue, and the resulting mixture was stirred while being cooled under a nitrogen atmosphere. Thereto, a mixed solution prepared by adding 49.5 g of p-methyl coumarate and 42.1 g of triethylamine to 200 mL of acetone was added dropwise. After dropwise addition, the resulting mixture was stirred at room temperature for 8 hours. Water was poured thereinto, and a precipitated crystal was filtered off. Furthermore, an organic layer was extracted from a filtrate, and dried over anhydrous magnesium sulfate, and a solvent was distilled off under reduced pressure. The resulting residue and a previously extracted crystal were recrystallized in toluene to give 77.7 g of compound (ex-1).

(Second Stage: Synthesis of Compound (Ex-2))

To 160 mL of THF and 80 mL of methanol, 77.7 g of compound (ex-1) was added, and the resulting mixture was stirred at room temperature under a nitrogen atmosphere. Thereto, 26 mL of aqueous ammonium solution was added dropwise. After dropwise addition, the resulting mixture was stirred at room temperature for 8 hours. Ethyl acetate and water were added thereto, an organic layer was extracted, and the resulting organic layer was washed with saturated brine. The resulting mixture was dried over anhydrous magnesium sulfate, a solvent was distilled off under reduced pressure, and a residue was recrystallized in methanol to give 43.7 g of compound (ex-2).

(Third Stage: Synthesis of Compound (M-1))

To 500 mL of dichloromethane, 43.7 g of compound (ex-2), 33.7 g of 2-metacryloxyethyl succinate, and 3.58 g of 4-dimethylaminopyridine (DMAP) were added, and the resulting mixture was stirred while being cooled under a nitrogen atmosphere. Thereto, 70 mL of dichloromethane solution of 31.7 g of 1,3-dicyclohexylcarbodiimide (DCC) were added dropwise. After dropwise addition, the resulting mixture was stirred at room temperature for 16 hours. A precipitated deposit was filtered off, and an organic layer was washed with water and dried over anhydrous magnesium sulfate. A solvent was distilled off under reduced pressure, a residue was purified by column chromatography (silica gel, an eluate: toluene-ethyl acetate mixture (volume ratio: toluene/ethyl acetate=8/1)), and recrystallized in ethanol to give 62.3 g of compound (M-1).

Phase transition temperature and analytical values by NMR of compound (M-1) obtained are as described below.

Phase transition temperature: C 86 (S 58 N 60) I.

$^1$H-NMR (CDCl$_3$; δ ppm): 8.23 (d, 2H), 7.71 (d, 1H), 7.60 (d, 2H), 7.28-7.23 (m, 4H), 6.43 (d, 1H), 6.13 (s, 1H), 5.59 (s, 1H), 4.32-4.26 (m, 4H), 3.82 (s, 3H), 2.93 (t, 2H), 2.80 (t, 2H), 1.94 (s, 3H).

(ii) Synthesis of Compound (M-2)

Formula 12

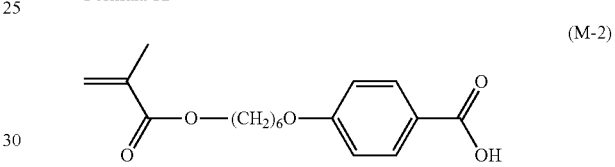

(M-2)

Compound (M-2) was synthesized in accordance with a method described in JP 2009-191117 A.

(iii) Synthesis of Polymer (P-1)

Polymer (P-1) was synthesized from compound (M-1) and compound (M-2) by procedures described below.

To 40 mL of THF, 2.5 g of compound (M-1), 7.5 g of compound (M-2) and 0.38 g of azobisisobutyronitrile (AIBN) were added, and the resulting mixture was stirred under reflux for 10 hours under a nitrogen atmosphere. A reaction mixture was poured into toluene to cause reprecipiration. A crystal was filtered off, and dried to give 8.7 g of polymer (P-1). A copolymerization ratio was: M-1=0.2 and M-2=0.8 in a mole fraction.

Polymer (P-1) obtained had Mw of 22,000, Mw/Mn of 2.8 and a liquid crystal phase in the range of 62° C. to 155° C.

Example 2

Preparation of Phase Difference Film F-1

Polymer (P-1) was dissolved into cyclopentanone (CPN) to adjust a solution having a solids concentration of 15% by weight. The solution was filtrated with a filter having a pore diameter of 0.2 micrometers to prepare photoalignable phase difference agent (H-1). The photoalignable phase difference agent (H-1) was applied onto a glass substrate by spin coating. On the occasion, applicability was satisfactory. The substrate was heated at 80° C. for 2 minutes, and a solvent was removed to form a coating film. Photoalignment treatment was applied onto a surface of the coating film, using an ultra-high pressure mercury lamp (made by USHIO, INC.), by irradiating the surface with 150 mJ/cm² of linearly polarized ultraviolet light having a wavelength near 313 nanometers from a direction at 90 degrees relative to a coated surface. The substrate was heated at 130° C. for 5 minutes to give phase difference film (F-1).

When phase difference film (F-1) was interposed between two polarizing plates arranged in a crossed nicol, and rotated in a horizontal plane, the film turned into a bright and dark state, and was confirmed to be in homogeneous alignment.

in a horizontal plane, the film turned into a bright and dark state, and was confirmed to be in homogeneous alignment.

Example 5

(i) Synthesis of Compound (M-3)

Compound (M-3) was synthesized according to a scheme described below.

Formula 13

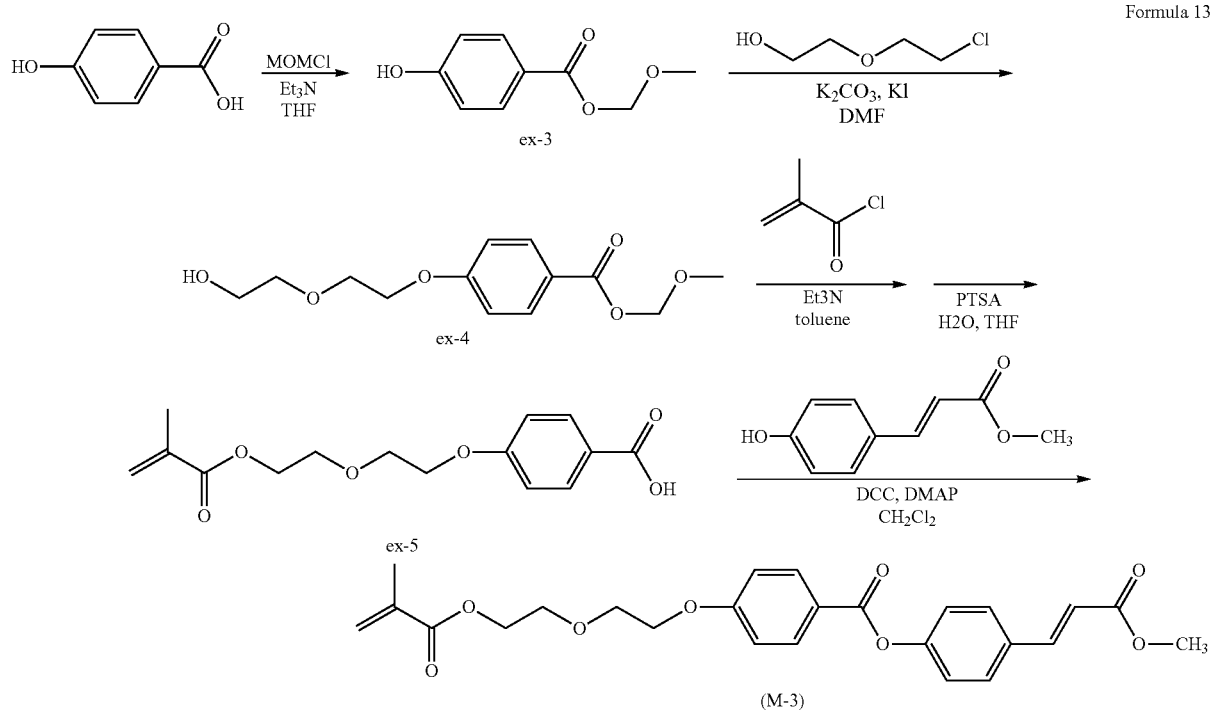

Example 3

Preparation of Phase Difference Film F-2

Phase difference film (F-2) was obtained in a manner similar to the operations in Example 2 except that a solids concentration of photoalignable phase difference agent (H-1) was adjusted to be 20% by weight in a CPN solution.

When phase difference film (F-2) was interposed between two polarizing plates arranged in a crossed nicol, and rotated in a horizontal plane, the film turned into a bright and dark state, and was confirmed to be in homogeneous alignment.

Example 4

Preparation of Phase Difference Film F-3

Phase difference film (F-3) was obtained in a manner similar to the operations in Example 2 except that a solids concentration of photoalignable phase difference agent (H-1) was adjusted to be 25% by weight in a CPN solution.

When phase difference film (F-3) was interposed between two polarizing plates arranged in a crossed nicol, and rotated (First Stage: Synthesis of Compound (Ex-3))

To 500 mL of THF, 30 g of p-hydroxybenzoic acid was added, and 36.6 g of triethylamine was added thereto, and the resulting mixture was stirred while being cooled under a nitrogen atmosphere. Thereto, 30.6 g of chloromethyl methyl ether (MOMCl) was added dropwise. After dropwise addition, the resulting mixture was stirred at room temperature for 8 hours. Ethyl acetate and water were added thereto, an organic layer was extracted, and the resulting organic layer was washed with a saturated aqueous solution of sodium hydrogencarbonate and water. The resulting mixture was dried over anhydrous magnesium sulfate, a solvent was distilled off under reduced pressure, and a residue was purified by column chromatography (silica gel, an eluate: toluene-ethyl acetate mixture (volume ratio: toluene/ethyl acetate=4/1)) to give 30.0 g of compound (ex-3).

(Second Stage: Synthesis of Compound (Ex-4))

To 150 mL of DMF, 30 g of compound (ex-3), 24.6 g of 2-(2-chloroethoxy)ethanol, 27.3 g of potassium carbonate and 3.3 g of potassium iodide were added, and the resulting mixture was stirred while being heated at 80° C. for 16 hours under a nitrogen atmosphere. Toluene and water were added thereto, an organic layer was extracted, and the resulting organic layer was washed with a saturated aqueous solution of sodium hydrogencarbonate and water. The resulting mixture was dried over anhydrous magnesium sulfate, a solvent was distilled off under reduced pressure, and a residue was purified by column chromatography (silica gel, an eluate: toluene-ethyl acetate mixture (volume ratio: toluene/ethyl acetate=2/1)) to give 22.0 g of compound (ex-4).

(Third Stage: Synthesis of Compound (Ex-5))

To 200 mL of toluene, 20 g of compound (ex-4) and 15.0 g of triethylamine were added, and the resulting mixture was stirred while being cooled under a nitrogen atmosphere. Thereto, 8.5 g of methacrylic acid chloride was added dropwise. After dropwise addition, the resulting mixture was stirred at room temperature for 8 hours. Water was added thereto, an organic layer was extracted, and the resulting organic layer was washed with water. The resulting mixture was dried over anhydrous magnesium sulfate, a solvent was distilled off under reduced pressure. To the resulting residue, 40 mL of THF was added, and 1.1 g of p-toluenesulfonic acid (PTSA) and 5 mL of water were further added, and the resulting mixture was stirred while being heated at 50° C. under a nitrogen atmosphere. Ethyl acetate and water were added thereto, an organic layer was extracted, and the resulting organic layer was washed with saturated brine. The resulting mixture was dried over anhydrous magnesium sulfate, a solvent was distilled off under reduced pressure, and a residue was purified in toluene to give 9.1 g of compound (ex-5).

(Fourth Stage: Synthesis of Compound (M-3))

To 50 mL of dichloromethane, 5 g of compound (ex-6), 3 g of p-methyl coumarate and 0.4 g of DMAP were added, and the resulting mixture was stirred while being cooled under a nitrogen atmosphere. Thereto, 8 mL of dichloromethane solution of 3.7 g of DCC was added dropwise. After dropwise addition, the resulting mixture was stirred at room temperature for 16 hours. A precipitated deposit was filtered off, and an organic layer was washed with water, and dried over anhydrous magnesium sulfate. A solvent was distilled off under reduced pressure, and a residue was purified by column chromatography (silica gel, an eluate: toluene-ethyl acetate mixture (volume ratio: toluene/ethyl acetate=10/1)), and recrystallized in ethanol to give 4.9 g of compound (M-3).

Phase transition temperature and analytical values by NMR of compound (M-3) obtained are as described below.

Phase transition temperature: C 78 (N 65) I.

$^1$H-NMR (CDCl$_3$; δ ppm): 8.14 (d, 2H), 7.71 (d, 1H), 7.59 (d, 2H), 7.24 (d, 2H), 7.01 (d, 2H), 6.42 (d, 1H), 6.14 (s, 1H), 5.58 (s, 1H), 4.35 (t, 2H), 4.23 (t, 2H), 3.92 (t, 2H), 3.84 (t, 2H), 3.82 (s, 3H), 1.95 (s, 3H).

(ii) Synthesis of Polymer (P-2)

Polymer (P-2) was synthesized from compound (M-3) and compound (M-2) by procedures described below.

To 15 mL of THF, 0.75 g of compound (M-3), 2.25 g of compound (M-2) and 0.11 g of azobisisobutyronitrile (AIBN) were added, and the resulting mixture was stirred under reflux for 10 hours under a nitrogen atmosphere. A reaction mixture was poured into toluene to cause reprecipiration. A crystal was filtered off, and dried to give 2.3 g of polymer (P-2). A copolymerization ratio was: M-1=0.2 and M-2=0.8 in a mole fraction.

Polymer (P-2) obtained had Mw of 12,000, Mw/Mn of 1.8 and a liquid crystal phase in the range of 63° C. to 153° C.

Example 6

Preparation of Phase Difference Film F-4

Polymer (P-2) was dissolved into cyclopentanone (CPN) to adjust a solution having a solids concentration of 15% by weight. The solution was filtrated with a filter having a pore diameter of 0.2 micrometers to prepare photoalignable phase difference agent (H-2). The photoalignable phase difference agent (H-2) was applied onto a glass substrate by spin coating. On the occasion, applicability was satisfactory. The substrate was heated at 80° C. for 2 minutes, and a solvent was removed to form a coating film. Photoalignment treatment was applied onto a surface of the coating film, using an ultra-high pressure mercury lamp (made by USHIO, INC.), by irradiating the surface with 50 mJ/cm$^2$ of linearly polarized ultraviolet light having a wavelength near 313 nanometers from a direction at 90 degrees relative to a coated surface. The substrate was heated at 130° C. for 5 minutes to give phase difference film (F-4).

When phase difference film (F-4) was interposed between two polarizing plates arranged in a crossed nicol, and rotated in a horizontal plane, the film turned into a bright and dark state, and was confirmed to be in homogeneous alignment.

Example 7

(i) Synthesis of compound (M-4)

Compound (M-4) was synthesized according to a scheme described below.

Formula 14

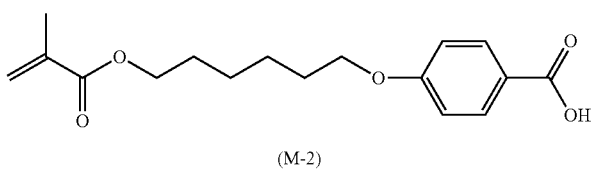
(M-2)

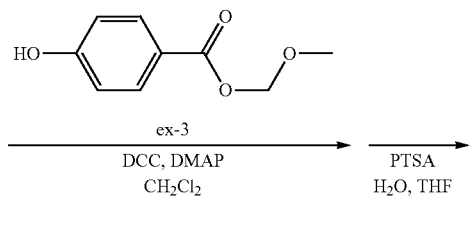

ex-3
DCC, DMAP
CH$_2$Cl$_2$

PTSA
H$_2$O, THF

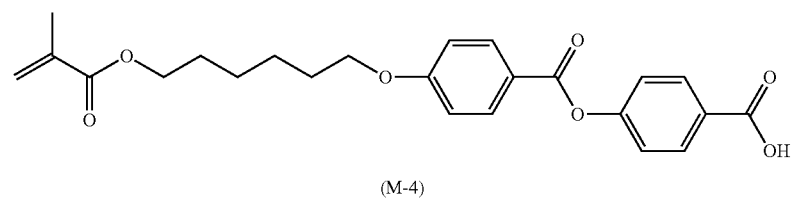
(M-4)

Hereinafter, synthesis of compound (M-4) will be more specifically explained.

(Synthesis of Compound (M-4))

To 100 mL of dichloromethane, 5.9 g of compound (ex-3), 10.0 g of compound (M-2) and 0.8 g of DMAP were added, and the resulting mixture was stirred while being cooled under a nitrogen atmosphere. Thereto, 20 mL of dichloromethane solution of 7.1 g of DCC was added dropwise. After dropwise addition, the resulting mixture was stirred at room temperature for 16 hours. A precipitated deposit was filtered off, and an organic layer was washed with water, and dried over anhydrous magnesium sulfate. A solvent was distilled off under reduced pressure, and a residue was purified by column chromatography (silica gel, an eluate: toluene-ethyl acetate mixture (volume ratio: toluene/ethyl acetate=8/1)). To the resulting residue, 30 mL of THF was added, and 0.6 g of PTSA and 3 mL of water were further added, and the resulting mixture was stirred while being heated at 50° C. under a nitrogen atmosphere. Ethyl acetate and water were added thereto, an organic layer was extracted, and the resulting organic layer was washed with saturated brine. The resulting mixture was dried over anhydrous magnesium sulfate, a solvent was distilled off under reduced pressure, and a residue was purified in ethanol to give 6.5 g of compound (M-4).

Formula 15

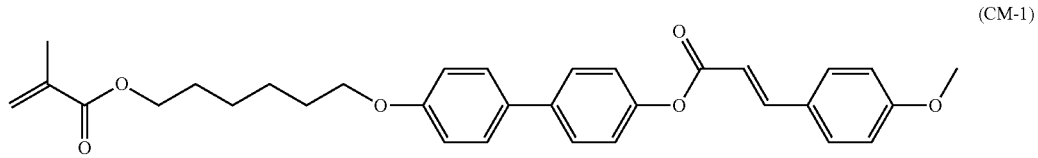

Phase transition temperature and analytical values by NMR of compound (M-4) obtained are as described below.

Phase transition temperature: C 115 S 200<1.

$^1$H-NMR (CDCl$_3$; δ ppm): 13.07 (s, 1H), 8.09 (d, 2H), 8.04 (d, 2H), 7.41 (d, 2H), 7.12 (d, 2H), 6.02 (s, 1H), 5.67 (s, 1H), 4.14-4.07 (m, 4H), 1.88 (s, 3H), 1.82-1.73 (m, 2H), 1.69-1.62 (m, 2H), 1.53-1.38 (m, 4H).

(ii) Synthesis of Polymer (P-3)

Polymer (P-3) was synthesized from compound (M-1), compound (M-2) and compound (M-4) by procedures described below.

To 15 mL of THF, 0.75 g of compound (M-1), 1.65 g of compound (M-2), 0.6 g of compound (M-4) and 0.11 g of azobisisobutyronitrile (AIBN) were added, and the resulting mixture was stirred under reflux for 10 hours under a nitrogen atmosphere. A reaction mixture was poured into toluene to cause reprecipiration. A crystal was filtered off, and dried to give 2.6 g of polymer (P-3). A copolymerization ratio was: M-1=0.2, M-2=0.7 and M-4=0.1 in a mole fraction.

Polymer (P-3) obtained had Mw of 27,000, Mw/Mn of 2.3 and a liquid crystal phase in the range of 58° C. to 167° C.

Example 8

Preparation of Phase Difference Film F-5

Polymer (P-3) was dissolved into cyclopentanone (CPN) to adjust a solution having a solids concentration of 15% by weight. The solution was filtrated with a filter having a pore diameter of 0.2 micrometers to prepare photoalignable phase difference agent (H-3). The photoalignable phase difference agent (H-3) was applied onto a glass substrate by spin coating. On the occasion, applicability was satisfactory. The substrate was heated at 80° C. for 2 minutes, and a solvent was removed to form a coating film. Photoalignment treatment was applied onto a surface of the coating film, using an ultra-high pressure mercury lamp (made by USHIO, INC.), by irradiating the surface with 200 mJ/cm$^2$ of linearly polarized ultraviolet light having a wavelength near 313 nanometers from a direction at 90 degrees relative to a coated surface. The substrate was heated at 140° C. for 5 minutes to give phase difference film (F-5).

When phase difference film (F-5) was interposed between two polarizing plates arranged in a crossed nicol, and rotated in a horizontal plane, the film turned into a bright and dark state, and was confirmed to be in homogeneous alignment.

Comparative Example 1

(i) Synthesis of Compound (CM-1)

Compound (CM-1) was synthesized in accordance with a method described in JP 2004-170595 A.

(ii) Synthesis of Polymer (CP-1)

Polymer (CP-1) was synthesized from compound (CM-1) and compound (M-2) by procedures described below.

To 20 mL of THF, 2.0 g of compound (CM-1), 2.0 g of compound (M-2) and 0.15 g of azobisisobutyronitrile (AIBN) were added, and the resulting mixture was stirred under reflux for 10 hours under a nitrogen atmosphere. A reaction mixture was poured into toluene to cause reprecipiration. A crystal was filtered off, and dried to give 3.6 g of polymer (CP-1).

Polymer (CP-1) obtained had Mw of 34,000, Mw/Mn of 2.4 and a liquid crystal phase in the range of 119° C. to 188° C.

Preparation of Phase Difference Film CF-1

Polymer (CP-1) was dissolved into cyclopentanone (CPN) to adjust a solution having a solids concentration of 10% by weight. The solution was filtrated with a filter having a pore diameter of 0.2 micrometers to prepare photoalignable phase difference agent (CH-1). The photoalignable phase difference agent (CH-1) was applied onto a glass substrate by spin coating. The substrate was heated at 80° C. for 2 minutes, and a solvent was removed to form a coating film. Photoalignment treatment was applied onto a surface of the coating film, using an ultra-high pressure mercury lamp (made by USHIO, INC.), by irradiating the surface with 100 mJ/cm$^2$ of linearly polarized ultraviolet light having a wavelength near 313 nanometers from a direction at 90 degrees relative to a coated surface. The substrate was heated at 130° C. for 5 minutes to give phase difference film (CF-1).

When phase difference film (CF-1) was interposed between two polarizing plates arranged in a crossed nicol, and rotated in a horizontal plane, the film turned into a bright and dark state, and was confirmed to be in homogeneous alignment.

Comparative Example 2

(i) Synthesis of Compound (CM-2)

Compound (CM-2) was synthesized according to a scheme described below.

3H), 1.89-1.82 (m, 2H), 1.78-1.71 (m, 2H), 1.58-1.45 (m, 4H).

(ii) Synthesis of Polymer (CP-2)

Polymer (CP-2) was synthesized from compound (CM-2) and compound (M-2) by procedures described below.

To 20 mL of THF, 1.0 g of compound (CM-2), 3.0 g of compound (M-2) and 0.15 g of azobisisobutyronitrile (AIBN) were added, and the resulting mixture was stirred under reflux for 10 hours under a nitrogen atmosphere. A reaction mixture was poured into toluene to cause reprecipiration. A crystal was filtered off, and dried to give 3.3 g of polymer (CP-2).

Formula 16

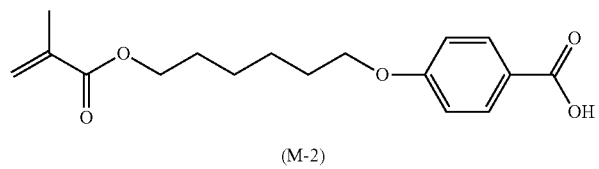
(M-2)

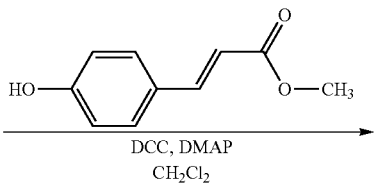

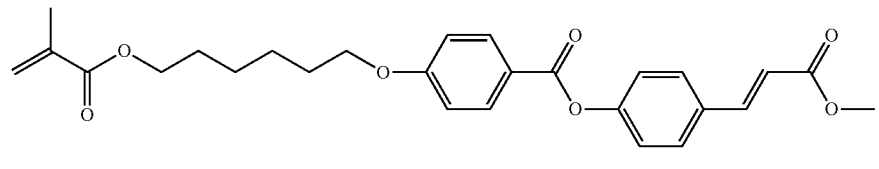
(CM-2)

(Synthesis of Compound (CM-2))

To 100 mL of dichloromethane, 5.8 g of p-methyl coumarate, 10.0 g of compound (M-2) and 0.8 g of DMAP were added, and the resulting mixture was stirred while being cooled under a nitrogen atmosphere. Thereto, 20 mL of dichloromethane solution of 7.1 g of DCC was added dropwise. After dropwise addition, the resulting mixture was stirred at room temperature for 16 hours. A precipitated deposit was filtered off, and an organic layer was washed with water, and dried over anhydrous magnesium sulfate. A solvent was distilled off under reduced pressure, and a residue was purified by column chromatography (silica gel, an eluate: toluene-ethyl acetate mixture (volume ratio: toluene/ethyl acetate=8/1)), and recrystallized in ethanol to give 9.8 g of compound (CM-2).

Phase transition temperature and analytical values by NMR of compound (CM-2) obtained are as described below.

Phase transition temperature: C 67 S 96 N 104 I.

$^1$H-NMR (CDCl$_3$; δ ppm): 8.13 (d, 2H), 7.70 (d, 1H), 7.58 (d, 2H), 7.24 (d, 2H), 6.97 (d, 2H), 6.43 (d, 1H), 6.10 (s, 1H), 5.56 (s, 1H), 4.17 (t, 2H), 4.05 (t, 2H), 3.81 (s, 3H), 1.95 (s, Polymer (CP-2) obtained had Mw of 28,000, Mw/Mn of 3.5 and a liquid crystal phase in the range of 148° C. to 160° C.

Preparation of Phase Difference Film CF-1

Polymer (CP-1) was dissolved into cyclopentanone (CPN) to adjust a solution having a solids concentration of 10% by weight. The solution was filtrated with a filter having a pore diameter of 0.2 micrometers to prepare photoalignable phase difference agent (CH-1). The photoalignable phase difference agent (CH-1) was applied onto a glass substrate by spin coating. The substrate was heated at 80° C. for 2 minutes, and a solvent was removed to form a coating film. Photoalignment treatment was applied onto a surface of the coating film, using an ultra-high pressure mercury lamp (made by USHIO, INC.), by irradiating the surface with 100 mJ/cm$^2$ of linearly polarized ultraviolet light having a wavelength near 313 nanometers from a direction at 90 degrees relative to a coated surface. The substrate was heated at 130° C. for 5 minutes to give phase difference film (CF-1).

When phase difference film (CF-1) was interposed between two polarizing plates arranged in a crossed nicol, and rotated in a horizontal plane, the film turned into a bright and dark state, and was confirmed to be in homogeneous alignment.

Comparative Example 2

(i) Synthesis of Compound (CM-2)

Compound (CM-2) was synthesized according to a scheme described below.

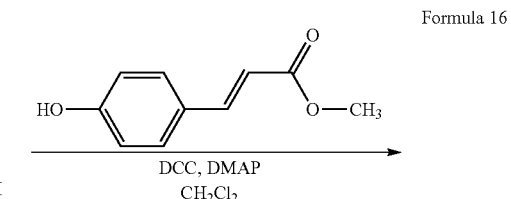

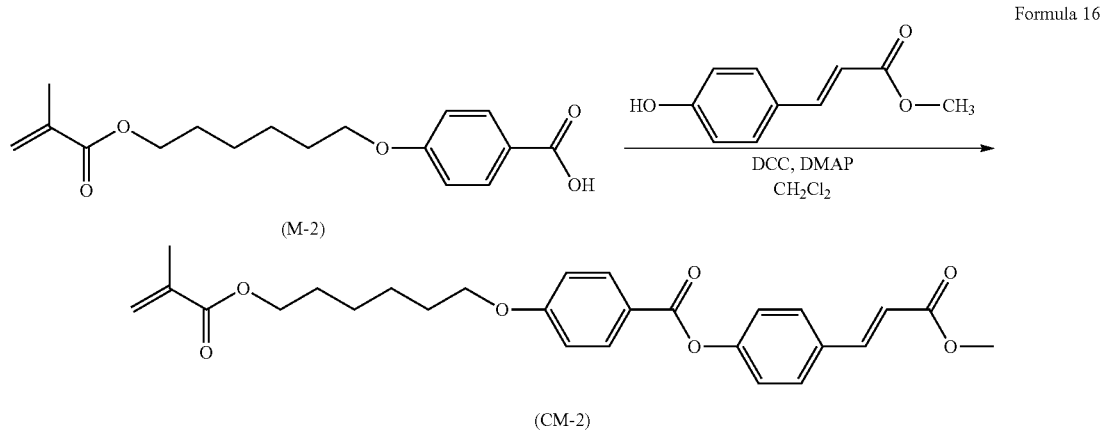

(Synthesis of Compound (CM-2))

To 100 mL of dichloromethane, 5.8 g of p-methyl coumarate, 10.0 g of compound (M-2) and 0.8 g of DMAP were added, and the resulting mixture was stirred while being cooled under a nitrogen atmosphere. Thereto, 20 mL of dichloromethane solution of 7.1 g of DCC was added dropwise. After dropwise addition, the resulting mixture was stirred at room temperature for 16 hours. A precipitated deposit was filtered off, and an organic layer was washed with water, and dried over anhydrous magnesium sulfate. A solvent was distilled off under reduced pressure, and a residue was purified by column chromatography (silica gel, an eluate: toluene-ethyl acetate mixture (volume ratio: toluene/ethyl acetate=8/1)), and recrystallized in ethanol to give 9.8 g of compound (CM-2).

Phase transition temperature and analytical values by NMR of compound (CM-2) obtained are as described below.

Phase transition temperature: C 67 S 96 N 104 I.

$^1$H-NMR (CDCl$_3$; δ ppm): 8.13 (d, 2H), 7.70 (d, 1H), 7.58 (d, 2H), 7.24 (d, 2H), 6.97 (d, 2H), 6.43 (d, 1H), 6.10 (s, 1H), 5.56 (s, 1H), 4.17 (t, 2H), 4.05 (t, 2H), 3.81 (s, 3H), 1.95 (s, 3H), 1.89-1.82 (m, 2H), 1.78-1.71 (m, 2H), 1.58-1.45 (m, 4H).

(ii) Synthesis of Polymer (CP-2)

Polymer (CP-2) was synthesized from compound (CM-2) and compound (M-2) by procedures described below.

To 20 mL of THF, 1.0 g of compound (CM-2), 3.0 g of compound (M-2) and 0.15 g of azobisisobutyronitrile (AIBN) were added, and the resulting mixture was stirred under reflux for 10 hours under a nitrogen atmosphere. A reaction mixture was poured into toluene to cause repreciparation. A crystal was filtered off, and dried to give 3.3 g of polymer (CP-2).

Polymer (CP-2) obtained had Mw of 28,000, Mw/Mn of 3.5 and a liquid crystal phase in the range of 148° C. to 160° C.

Preparation of Phase Difference Film CF-2

Polymer (CP-2) was dissolved into cyclopentanone (CPN) to adjust a solution having a solids concentration of 15% by weight. The solution was filtrated with a filter having a pore diameter of 0.2 micrometers to prepare photoalignable phase difference agent (CH-2). The photoalignable phase difference agent (CH-2) was applied onto a glass substrate by spin coating. The substrate was heated at 80° C. for 2 minutes, and a solvent was removed to form a coating film. Photoalignment treatment was applied onto a surface of the coating film, using an ultra-high pressure mercury lamp (made by USHIO, INC.), by irradiating the surface with 150 mJ/cm$^2$ of linearly polarized ultraviolet light having a wavelength near 313 nanometers from a direction at 90 degrees relative to a coated surface. The substrate was heated at 140° C. for 5 minutes to give phase difference film (CF-2).

When phase difference film (CF-2) was interposed between two polarizing plates arranged in a crossed nicol, and rotated in a horizontal plane, the film turned into a bright and dark state, and was confirmed to be in homogeneous alignment.

Comparative Example 3

Preparation of Phase Difference Film CF-3

Phase difference film (CF-3) was obtained in a manner similar to the operations described in Comparative Example 2 except that a solids concentration of photoalignable phase difference agent (CH-2) was adjusted to be a CPN solution having 20% by weight.

When phase difference film (CF-3) was interposed between two polarizing plates arranged in a crossed nicol, and rotated in a horizontal plane, the film turned into a bright and dark state, and was confirmed to be in homogeneous alignment.

Comparative Example 4

Preparation of Phase Difference Film CF-4

Phase difference film (CF-4) was obtained in a manner similar to the operations described in Comparative Example 2 except that a solids concentration of photoalignable phase difference agent (CH-2) was adjusted to be a CPN solution having 25% by weight.

When phase difference film (CF-4) was interposed between two polarizing plates arranged in a crossed nicol, and rotated in a horizontal plane, the film turned into a bright and dark state, and was confirmed to be in homogeneous alignment.

Example 9

Solubility of a Polymer

With regard to each of polymers (P-1) to (P-3), and (CP-1) and (CP-2), a total weight of a polymer and a solvent was adjusted to be 100 parts by weight, and solubility to various kinds of solvents when the polymer was in an amount of 10, 20 and 30 parts by weight was evaluated by visual observation, and a sample in which the polymer was completely dissolved into the solvent was rated to be good, a sample in which an insoluble matter remained was rated to be bad, and a sample in which the polymer was once dissolved into the solvent but immediately precipitated was rated to be marginal. The results are shown in Table 2 below.

TABLE 2

| | 1-Methoxy-2-propanol | | | Cyclopentanone | | | Methyl ethyl ketone | | |
|---|---|---|---|---|---|---|---|---|---|
| | 10 | 20 | 30 | 10 | 20 | 30 | 10 | 20 | 30 |
| P-1 | Good | Good | Good | Good | Good | Good | Good | Good | Bad |
| P-2 | Good | Good | Good | Good | Good | Good | Good | Marginal | Bad |
| P-3 | Good | Good | Marginal | Good | Good | Good | Bad | Bad | Bad |
| CP-1 | Good | Bad | Bad | Good | Marginal | Bad | Bad | Bad | Bad |
| CP-2 | Good | Marginal | Bad | Good | Good | Good | Bad | Bad | Bad |

Example 10

Alignment Properties, Retardation and Optical Anisotropy Δn of a Phase Difference Film An alignment defect was observed for phase difference films (F-1) to (F-5), and (CF-1) to (CF-4) by a polarizing microscope. A film having no alignment defect was rated to be good, and a film having an alignment defect was rated to be bad. Moreover, retardation (Re) was measured by an ellipsometer, and a value of optical anisotropy Δn was calculated from a value of Re and film thickness. The results are shown in Table 3 below.

TABLE 3

| | Alignment defect | Re | Film thickness | Δn |
|---|---|---|---|---|
| F-1 | Good | 91.6 nm | 0.88 μm | 0.10 |
| F-2 | Good | 132.4 nm | 1.60 μm | 0.08 |
| F-3 | Good | 195.5 nm | 2.62 μm | 0.07 |
| F-4 | Good | 70.0 nm | 0.81 μm | 0.08 |
| F-5 | Good | 144.0 nm | 1.08 μm | 0.13 |
| CF-1 | Good | 18.6 nm | 0.44 μm | 0.04 |
| CF-2 | Good | 79.8 nm | 0.86 μm | 0.09 |
| CF-3 | Good | 90.4 nm | 1.62 μm | 0.06 |
| CF-4 | Good | 86.4 nm | 2.73 μm | 0.03 |

Example 11

Preparation of Polymerizable Liquid Crystal Composition (1)

Four compounds were mixed at ratios: compound (LC-1-1): compound (LC-2-1): compound (LC-5-1): compound (LC-6-1)=25:25:40:10 (weight ratio). The composition is taken as MIX1. Based on the total weight of the MIX1, a nonionic fluorine-based surfactant (trade name: Futargent (registered trademark) FTX-218, made by Neos Co., Ltd.) in a weight ratio of 0.002 and polymerization initiator Irgacure 907 (registered trademark, made by BASF A.G.) in a ratio of 0.06 were added. Toluene was added to the composition to prepare polymerizable liquid crystal composition (1) in which a ratio of solvent was 80% by weight.

Formula 17

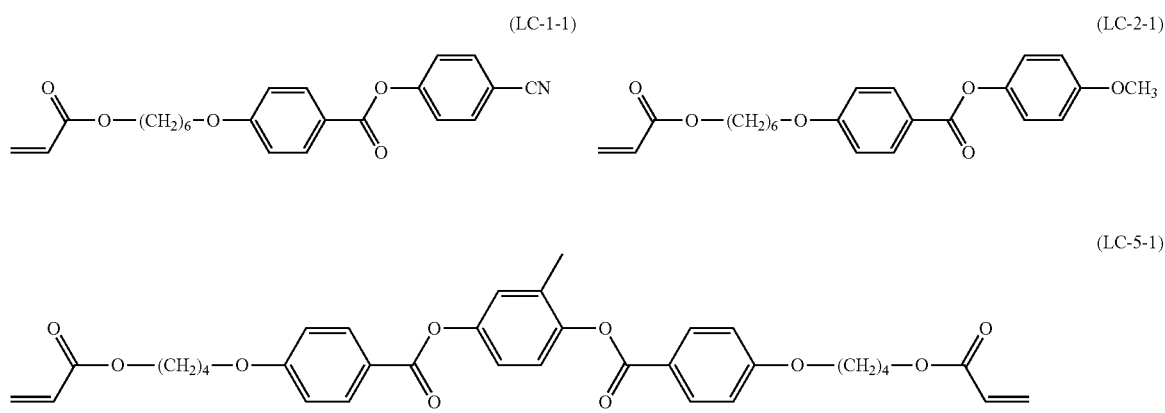

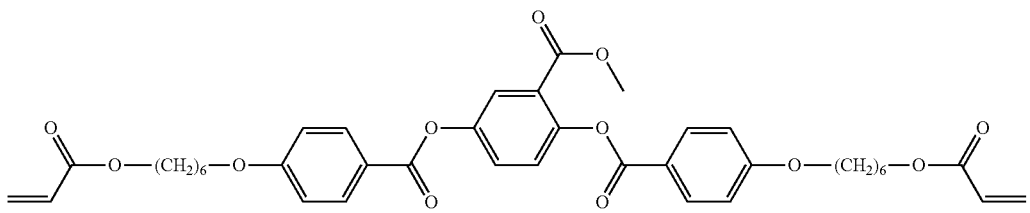

(LC-6-1)

Specific methods for manufacturing the compounds (LC-1-1), (LC-2-1), (LC-5-1) and (LC-6-1) described above will be explained. Compounds (LC-1-1) and (LC-2-1) were synthesized in accordance with a method described in Makromol. Chem. 183, 2311-2321 (1982). Compound (LC-5-1) was synthesized in accordance with a method described in Makromol. Chem. 192, 59-74 (1991). Compound (LC-6-1) was synthesized in accordance with a method described in JP 2006-348022 A.

Laminate

Polymerizable liquid crystal composition (1) was applied by spin coating onto phase difference film F-1 obtained in Example 2. The substrate was heated at 80° C. for 2 minutes, and then cooled at room temperature for 3 minutes, and a coating film from which a solvent was removed was polymerized by ultraviolet light in atmospheric air to give an optical film in which an alignment state of liquid crystals was immobilized. When the optical film was observed by a polarizing microscope, the film was confirmed to have no alignment defect and have uniform alignment. When retardation of the optical film was measured, the film was confirmed to be in homogeneous alignment.

Example 12

Synthesis of Polymer (P-4)

Polymer (P-4) was synthesized from compound (M-1) by procedures described below.

To 20 mL of THF, 4.0 g of compound (M-1) and 0.15 g of azobisisobutyronitrile (AIBN) were added, and the resulting mixture was stirred under reflux for 10 hours under a nitrogen atmosphere. A reaction mixture was poured into methanol to cause reprecipiration. A crystal was filtered off, and dried to give 3.5 g of polymer (P-4).

Polymer (P-4) obtained had Mw of 31,000 and Mw/Mn of 2.2, and a liquid crystal phase in the range of 103° C. to 183° C.

Preparation of Phase Difference Film F-6

Polymer (P-4) was dissolved into cyclopentanone (CPN) to adjust a solution having a solids concentration of 20% by weight. The solution was filtrated with a filter having a pore diameter of 0.2 micrometers to prepare photoalignable phase difference agent (H-4). The photoalignable phase difference agent (H-4) was applied onto a glass substrate by spin coating. On the occasion, applicability was satisfactory. The substrate was heated at 80° C. for 2 minutes, and a solvent was removed to form a coating film. Photoalignment treatment was applied onto a surface of the coating film, using an ultra-high pressure mercury lamp (made by USHIO, INC.), by irradiating the surface with 200 mJ/cm² of linearly polarized ultraviolet light having a wavelength near 313 nanometers from a direction at 90 degrees relative to a coated surface. The substrate was heated at 150° C. for 5 minutes to give phase difference film (F-6).

Example 13

Synthesis of Polymer (P-5)

Polymer (P-5) was synthesized from compound (M-1) and compound (M-2) by procedures described below.

To 20 mL of THF, 3.0 g of compound (M-1), 1.0 g of compound (M-2) and 0.15 g of azobisisobutyronitrile (AIBN) were added, and the resulting mixture was stirred under reflux for 10 hours under a nitrogen atmosphere. A reaction mixture was poured into toluene to cause reprecipitation. A crystal was filtered off, and dried to give 3.3 g of polymer (P-5). A copolymerization ratio was: M-1=0.8 and M-2=0.2 in a mole fraction.

Polymer (P-5) obtained had Mw of 42,000 and Mw/Mn of 2.5, and a liquid crystal phase in the range of 81° C. to 156° C.

Preparation of Phase Difference Film F-7

Polymer (P-5) was dissolved into cyclopentanone (CPN) to adjust a solution having a solids concentration of 20% by weight. The solution was filtrated with a filter having a pore diameter of 0.2 micrometers to prepare photoalignable phase difference agent (H-5). The photoalignable phase difference agent (H-5) was applied onto a glass substrate by spin coating. On the occasion, applicability was satisfactory. The substrate was heated at 80° C. for 2 minutes, and a solvent was removed to form a coating film. Photoalignment treatment was applied onto a surface of the coating film, using an ultra-high pressure mercury lamp (made by USHIO, INC.), by irradiating the surface with 200 mJ/cm² of linearly polarized ultraviolet light having a wavelength near 313 nanometers from a direction at 90 degrees relative to a coated surface. The substrate was heated at 140° C. for 5 minutes to give phase difference film (F-7).

Example 14

Synthesis of Polymer (P-6)

Polymer (P-6) was synthesized from compound (M-1) and compound (M-2) by procedures described below.

To 20 mL of THF, 2.0 g of compound (M-1), 2.0 g of compound (M-2) and 0.15 g of azobisisobutyronitrile (AIBN) were added, and the resulting mixture was stirred under reflux for 10 hours under a nitrogen atmosphere. A reaction mixture was poured into toluene to cause reprecipitation. A crystal was filtered off, and dried to give 3.6 g of polymer (P-6). A copolymerization ratio was: M-1=0.4 and M-2=0.6 in a mole fraction.

Polymer (P-6) obtained had Mw of 42,000 and Mw/Mn of 2.2, and a liquid crystal phase in the range of 69° C. to 149° C.

Preparation of Phase Difference Film F-8

Polymer (P-6) was dissolved into cyclopentanone (CPN) to adjust a solution having a solids concentration of 20% by weight. The solution was filtrated with a filter having a pore diameter of 0.2 micrometers to prepare photoalignable phase difference agent (H-6). The photoalignable phase difference agent (H-6) was applied onto a glass substrate by spin coating. On the occasion, applicability was satisfactory. The substrate was heated at 80° C. for 2 minutes, and a solvent was removed to form a coating film. Photoalignment treatment was applied onto a surface of the coating film, using an ultra-high pressure mercury lamp (made by USHIO, INC.), by irradiating the surface with 200 mJ/cm$^2$ of linearly polarized ultraviolet light having a wavelength near 313 nanometers from a direction at 90 degrees relative to a coated surface. The substrate was heated at 140° C. for 5 minutes to give phase difference film (F-8).

Example 15

Synthesis of Polymer (P-7)

Polymer (P-7) was synthesized from compound (M-1) and compound (M-2) by procedures described below.

To 20 mL of THF, 0.4 g of compound (M-1), 3.6 g of compound (M-2) and 0.15 g of azobisisobutyronitrile (AIBN) were added, and the resulting mixture was stirred under reflux for 10 hours under a nitrogen atmosphere. A reaction mixture was poured into toluene to cause reprecipitation. A crystal was filtered off, and dried to give 3.4 g of polymer (P-7). A copolymerization ratio was: M-1=0.1 and M-2=0.9 in a mole fraction.

Polymer (P-7) obtained had Mw of 25,000 and Mw/Mn of 2.2, and a liquid crystal phase in the range of 78° C. to 166° C.

Preparation of Phase Difference Film F-9

Polymer (P-7) was dissolved into cyclopentanone (CPN) to adjust a solution having a solids concentration of 20% by weight. The solution was filtrated with a filter having a pore diameter of 0.2 micrometers to prepare photoalignable phase difference agent (H-7). The photoalignable phase difference agent (H-7) was applied onto a glass substrate by spin coating. On the occasion, applicability was satisfactory. The substrate was heated at 80° C. for 2 minutes, and a solvent was removed to form a coating film. Photoalignment treatment was applied onto a surface of the coating film, using an ultra-high pressure mercury lamp (made by USHIO, INC.), by irradiating the surface with 200 mJ/cm$^2$ of linearly polarized ultraviolet light having a wavelength near 313 nanometers from a direction at 90 degrees relative to a coated surface. The substrate was heated at 120° C. for 5 minutes to give phase difference film (F-9).

Example 16

Alignment Properties, Retardation and Optical Anisotropy Δn of a Phase Difference Film An alignment defect was observed for phase difference films (F-2) and (F-6) to (F-9) by a polarizing microscope. A film having no alignment defect was rated to be good, and a film having an alignment defect was rated to be bad. Moreover, retardation (Re) was measured by an ellipsometer, and a value of optical anisotropy Δn was calculated from a value of Re and film thickness. The results are shown in Table 4 below.

TABLE 4

|  | Alignment defect | Re | Film thickness | Δn |
|---|---|---|---|---|
| F-2 | Good | 132.4 nm | 1.60 μm | 0.08 |
| F-6 | Bad (homeotropic alignment) | 6.9 nm | 1.58 μm | — |
| F-7 | Good | 25.6 nm | 1.62 μm | 0.02 |
| F-8 | Good | 73.1 nm | 1.34 μm | 0.05 |
| F-9 | Good | 40.2 nm | 1.54 μm | 0.03 |

Optical anisotropy Δn was confirmed to be different depending on a difference in the copolymerization ratio between compound (M-1) and compound (M-2).

Comparative Example 5

(i) Synthesis of Compound (CM-3)

Formula 16

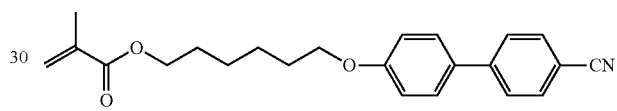

(CM-3)

Compound (CM-3) was synthesized in accordance with a method described in Macromolecules, 39, 1364-1375 (2006).

Comparative Example 6

(ii) Synthesis of Polymer (CP-3)

Polymer (CP-3) was synthesized from compound (M-1) and compound (CM-3) by procedures described below.

To 20 mL of THF, 1.0 g of compound (M-1), 3.0 g of compound (CM-3) and 0.15 g of azobisisobutyronitrile (AIBN) were added, and the resulting mixture was stirred under reflux for 10 hours under a nitrogen atmosphere. A reaction mixture was poured into toluene to cause reprecipitation. A crystal was filtered off, and dried to give 3.5 g of polymer (CP-3). A copolymerization ratio was: M-1=0.1 and M-2=0.9 in a mole fraction.

Polymer (CP-3) obtained had Mw of 42,000 and Mw/Mn of 2.8, and a liquid crystal phase in the range of 65° C. to 173° C.

Preparation of Phase Difference Film CF-5

Polymer (CP-3) was dissolved into cyclopentanone (CPN) to adjust a solution having a solids concentration of 20% by weight. The solution was filtrated with a filter having a pore diameter of 0.2 micrometers to prepare photoalignable phase difference agent (CH-5). The photoalignable phase difference agent (CH-5) was applied onto a glass substrate by spin coating. On the occasion, applicability was satisfactory. The substrate was heated at 80° C. for 2 minutes, and a solvent was removed to form a coating film. Photoalignment treatment was applied onto a surface of the coating film, using an ultra-high pressure mercury lamp (made by USHIO, INC.), by irradiating the surface with 200 mJ/cm² of linearly polarized ultraviolet light having a wavelength near 313 nanometers from a direction at 90 degrees relative to a coated surface. The substrate was heated at 150° C. for 5 minutes to give phase difference film (CF-5).

CF-5 turned into homeotropic alignment and satisfactory Re was not obtained.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

INDUSTRIAL APPLICABILITY

Brief Description of the Drawings

A photosensitive polymer of the invention is a material suitable for a photoalignment method. Moreover, a phase difference film obtained using the photosensitive polymer of the invention does not need an alignment film, and therefore simplification of a manufacturing process and reduction of member cost are expected. Moreover, development of satisfactory optical anisotropy is allowed even without needing a special manufacturing process. Furthermore, special alignment such as three-dimensional alignment is allowed, and lamination of phase difference films is facilitated. One of the phase difference films of the invention is suitable for use in an optical film or a liquid crystal display device.

What is claimed is:

1. A photosensitive polymer, comprising a constitutional unit having a photosensitive group as represented by formula (1), and a constitutional unit having a hydrogen-bondable group at a terminal as represented by formula (2):

Formula 1

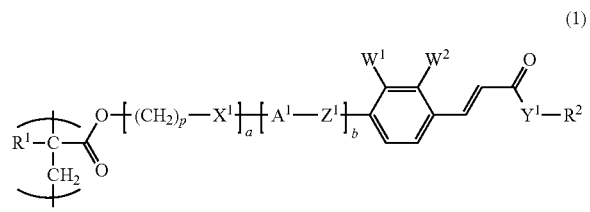

wherein, in formula (1), $R^1$ is independently hydrogen or methyl; a is 2 or 3; p is independently an integer from 1 to 12; $X^1$ is independently —O—, —COO— or —OCO—; b is an integer from 0 to 3; $A^1$ is independently any one of divalent group selected from 1,4-phenylene, 1,4-cyclohexylene, pyridine-2,5-diyl or naphthalene-2,6-diyl, and in the divalent group, at least one of hydrogen may be replaced by fluorine, chlorine, cyano, hydroxy, formyl, acetoxy, acetyl, trifluoroacetyl, difluoromethyl, trifluoromethyl, alkyl having 1 to 5 carbons or alkoxy having 1 to 5 carbons; $Z^1$ is independently a single bond, —O—, —COO—, —OCO—, —CH=CH—COO—, —CH₂CH₂—COO—, —CH₂O—, —OCH₂—, —CF₂O—, —OCF₂—, —CONH—, —NHCO—, —(CH₂)₄—, —CH₂CH₂—, —CH=CH— or —C≡C—; $W^1$ and $W^2$ are independently hydrogen, fluorine, chlorine, trifluoromethyl, alkyl having 1 to 5 carbons or alkoxy having 1 to 5 carbons; $Y^1$ is a single bond, —O— or —NH—; and $R^2$ is alkyl having 1 to 20 carbons, and at least one of —CH₂— in the alkyl may be replaced by —O—, —COO—, —OCO—, —CH=CH— or —C≡C—:

Formula 2

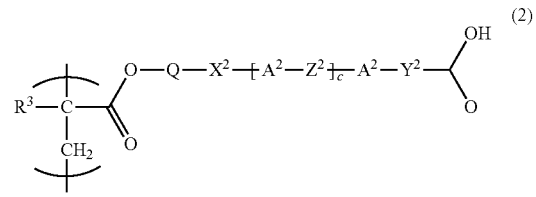

wherein, in formula (2), $R^3$ is hydrogen or methyl; Q is a single bond or alkylene having 1 to 20 carbons, and at least one of —CH₂— in the alkylene may be replaced by —O—, —COO—, —OCO—, —CH=CH— or —C≡C—; $X^2$ is a single bond, —O—, —COO—, —OCO—, —OCOO—, —CH=CH— or —C≡C—; $A^2$ is independently any one of divalent group selected from 1,4-phenylene, 1,4-cyclohexylene, pyridine-2,5-diyl or naphthalene-2,6-diyl, and in the divalent group, arbitrary hydrogen may be replaced by fluorine, chlorine, cyano, hydroxy, formyl, acetoxy, acetyl, trifluoroacetyl, difluoromethyl, trifluoromethyl, alkyl having 1 to 5 carbons or alkoxy having 1 to 5 carbons; $Z^2$ is independently a single bond, —O—, —COO—, —OCO—, —CH=CH—COO—, —CH₂CH₂—COO—, —CH₂O—, —OCH₂—, —CF₂O—, —OCF₂—, —CONH—, —NHCO—, —(CH₂)₄—, —CH₂CH₂—, —CH=CH— or —C≡C—; c is an integer from 0 to 2; and $Y^2$ is a single bond, —CH₂CH₂— or —CH=CH—.

2. The photosensitive polymer according to claim 1, wherein, in formula (2), Q is alkylene having 1 to 12 carbons, and at least one of —CH₂— in the alkylene may be replaced by —O—, —COO— or —OCO—; $X^2$ is —O—, —COO— or —OCO—; $A^2$ is independently any one of divalent group selected from 1,4-phenylene or naphthalene-2,6-diyl, and in the divalent group, arbitrary hydrogen may be replaced by fluorine, alkyl having 1 to 5 carbons or alkoxy having 1 to 5 carbons; $Z^2$ is independently a single bond, —COO—, —CH=CH—COO—, —CH₂CH₂—COO—, —CH₂O—, —CONH— or —CH₂CH₂—; and $Y^2$ is a single bond.

3. The photosensitive polymer according to claim 1, having liquid crystallinity.

4. The photosensitive polymer according to claim 1, wherein weight average molecular weight is 1,000 to 500,000.

5. A photoalignable phase difference agent, comprising at least one photosensitive polymer according to claim 1.

6. A phase difference film provided with optical anisotropy by applying the photoalignable phase difference agent according to claim 5 onto a substrate, irradiating the resulting material with linearly polarized light, and further heating the resulting irradiated material.

7. An optical film manufactured using the phase difference film according to claim 6.

8. A display device manufactured using the optical film according to claim 7.

9. A laminate, comprising by further applying an optical anisotropic material onto the phase difference film according to claim 7.

10. The laminate according to claim 9, wherein the optical anisotropic material is an anisotropic polymer formed of a polymerizable liquid crystal composition.

* * * * *